US007707039B2

(12) United States Patent
King et al.

(10) Patent No.: US 7,707,039 B2
(45) Date of Patent: Apr. 27, 2010

(54) AUTOMATIC MODIFICATION OF WEB PAGES

(75) Inventors: Martin T. King, Vashon Island, WA (US); Clifford A. Kushler, Lynnwood, WA (US); James Quentin Stafford-Fraser, Cambridge (GB)

(73) Assignee: Exbiblio B.V., Amsterdam (NL)

( * ) Notice: Subject to any disclaimer, the term of this patent is extended or adjusted under 35 U.S.C. 154(b) by 760 days.

(21) Appl. No.: 11/004,637

(22) Filed: Dec. 3, 2004

(65) Prior Publication Data
US 2005/0234851 A1      Oct. 20, 2005

Related U.S. Application Data

(60) Provisional application No. 60/558,527, filed on Apr. 1, 2004, provisional application No. 60/558,909, filed on Apr. 2, 2004, provisional application No. 60/559,766, filed on Apr. 6, 2004, provisional application No. 60/561,768, filed on Apr. 12, 2004, provisional application No. 60/564,846, filed on Apr. 23, 2004, provisional application No. 60/564,688, filed on Apr. 23, 2004, provisional application No. 60/602,898, filed on Aug. 18, 2004.

(51) Int. Cl.
*G06Q 10/00* (2006.01)
*G06F 17/30* (2006.01)
*G06K 9/22* (2006.01)

(52) U.S. Cl. .................. 705/1; 705/26; 705/27; 707/3; 707/6; 382/305; 382/313

(58) Field of Classification Search .............. 705/1, 705/26, 27; 707/1, 10, E17.108, 3, 6; 235/375; 382/305, 313
See application file for complete search history.

(56) References Cited

U.S. PATENT DOCUMENTS 4,052,058 A    10/1977   Hintz
4,526,078 A    7/1985    Chadabe (Continued)

FOREIGN PATENT DOCUMENTS

EP    0424803    5/1991

(Continued)

OTHER PUBLICATIONS

Morgan N. Price, Gene Golovchinsky and Bill N. Schilit, "Linking by Inking: Trailblazing in a Paper-link Hypertext," Proceedings of Hypertext '98, pp. 20-24, 1998,hereinafter Paperlink extracted from the references cited in US Patent 6,671, 684 to Hull et al.*

(Continued)

*Primary Examiner*—Yogesh C Garg
(74) *Attorney, Agent, or Firm*—Perkins Coie LLP

(57) ABSTRACT

Systems and methods for quickly and easily getting information about, or included in, a paper document into a public or private digital page. One embodiment of an example system includes a scanner that generates scan information from at least a portion of a paper document and a processing system that receives the generated scan information from the scanner, accesses a database of digital documents, searches the database based on the received scan information, locates a digital document corresponding to the paper document, and sends either the digital content or a hyperlink to the digital content to a predetermined web page.

7 Claims, 4 Drawing Sheets

U.S. PATENT DOCUMENTS

| | | | |
|---|---|---|---|
| 4,538,072 A | 8/1985 | Immler et al. |
| 4,610,025 A | 9/1986 | Blum et al. |
| 4,636,848 A | 1/1987 | Yamamoto et al. |
| 4,713,008 A | 12/1987 | Stocker et al. |
| 4,716,804 A | 1/1988 | Chadabe |
| 4,748,678 A | 5/1988 | Takeda et al. |
| 4,776,464 A | 10/1988 | Miller et al. |
| 4,804,949 A | 2/1989 | Faulkerson |
| 4,805,099 A | 2/1989 | Huber |
| 4,829,453 A | 5/1989 | Katsuta et al. |
| 4,829,872 A | 5/1989 | Topic et al. |
| 4,890,230 A | 12/1989 | Tanoshima et al. |
| D306,162 S | 2/1990 | Faulkerson et al. |
| 4,901,364 A | 2/1990 | Faulkerson et al. |
| 4,941,125 A | 7/1990 | Boyne |
| 4,947,261 A | 8/1990 | Ishikawa et al. |
| 4,949,391 A | 8/1990 | Faulkerson et al. |
| 4,968,877 A | 11/1990 | McAvinney et al. |
| 4,985,863 A | 1/1991 | Fujisawa et al. |
| 4,988,981 A | 1/1991 | Zimmerman et al. |
| 5,010,500 A | 4/1991 | Makkuni et al. |
| 5,012,349 A | 4/1991 | de Fay |
| 5,062,143 A | 10/1991 | Schmitt |
| 5,083,218 A | 1/1992 | Takasu et al. |
| 5,093,873 A | 3/1992 | Takahashi et al. |
| 5,109,439 A | 4/1992 | Froessl |
| 5,119,081 A | 6/1992 | Ikehira et al. |
| 5,133,024 A | 7/1992 | Froessl et al. |
| 5,133,052 A | 7/1992 | Bier et al. |
| 5,136,687 A | 8/1992 | Edelman et al. |
| 5,146,404 A | 9/1992 | Calloway et al. |
| 5,146,552 A | 9/1992 | Cassorla et al. |
| 5,157,384 A | 10/1992 | Greanias et al. |
| 5,168,565 A | 12/1992 | Morita et al. |
| 5,179,652 A | 1/1993 | Rozmanith et al. |
| 5,185,857 A | 2/1993 | Rozmanith et al. |
| 5,202,985 A | 4/1993 | Goyal |
| 5,203,704 A | 4/1993 | McCloud |
| 5,229,590 A | 7/1993 | Harden et al. |
| 5,231,698 A | 7/1993 | Forcier |
| 5,243,149 A | 9/1993 | Comerford et al. |
| 5,247,285 A | 9/1993 | Yokota et al. |
| 5,251,106 A | 10/1993 | Hui |
| 5,251,316 A | 10/1993 | Anick et al. |
| 5,252,951 A | 10/1993 | Tannenbaum et al. |
| RE34,476 E | 12/1993 | Norwood |
| 5,288,938 A | 2/1994 | Wheaton |
| 5,301,243 A | 4/1994 | Olschafskie et al. |
| 5,347,295 A | 9/1994 | Agulnick et al. |
| 5,347,306 A | 9/1994 | Nitta |
| 5,347,477 A | 9/1994 | Lee |
| 5,355,146 A | 10/1994 | Chiu et al. |
| 5,360,971 A | 11/1994 | Kaufman et al. |
| 5,367,453 A | 11/1994 | Capps et al. |
| 5,377,706 A | 1/1995 | Huang |
| 5,398,310 A | 3/1995 | Tchao et al. |
| 5,404,442 A | 4/1995 | Foster et al. |
| 5,404,458 A | 4/1995 | Zetts |
| 5,418,684 A | 5/1995 | Koenck et al. |
| 5,418,717 A | 5/1995 | Su et al. |
| 5,418,951 A | 5/1995 | Damashek |
| 5,423,554 A | 6/1995 | Davis |
| 5,430,558 A | 7/1995 | Sohaei et al. |
| 5,438,630 A | 8/1995 | Chen et al. |
| 5,452,442 A | 9/1995 | Kephart |
| 5,454,043 A | 9/1995 | Freeman |
| 5,462,473 A | 10/1995 | Sheller |
| 5,465,325 A | 11/1995 | Capps et al. |
| 5,467,425 A | 11/1995 | Lau et al. |
| 5,481,278 A | 1/1996 | Shigematsu et al. |
| 5,485,565 A | 1/1996 | Saund et al. |
| 5,488,196 A | 1/1996 | Zimmerman et al. |
| 5,499,108 A | 3/1996 | Cotte et al. |
| 5,500,937 A | 3/1996 | Thompson-Rohrlich |
| 5,502,803 A | 3/1996 | Yoshida et al. |
| 5,512,707 A | 4/1996 | Ohshima |
| 5,517,578 A | 5/1996 | Altman et al. |
| 5,533,141 A | 7/1996 | Futatsugi et al. |
| 5,539,427 A | 7/1996 | Bricklin et al. |
| 5,543,591 A | 8/1996 | Gillespie et al. |
| 5,550,930 A | 8/1996 | Berman et al. |
| 5,555,363 A | 9/1996 | Tou et al. |
| 5,563,996 A | 10/1996 | Tchao |
| 5,568,452 A | 10/1996 | Kronenberg |
| 5,570,113 A | 10/1996 | Zetts |
| 5,574,804 A | 11/1996 | Olschafskie et al. |
| 5,581,276 A | 12/1996 | Cipolla et al. |
| 5,581,670 A | 12/1996 | Bier et al. |
| 5,581,681 A | 12/1996 | Tchao et al. |
| 5,583,542 A | 12/1996 | Capps et al. |
| 5,583,543 A | 12/1996 | Takahashi et al. |
| 5,583,980 A | 12/1996 | Anderson |
| 5,590,219 A | 12/1996 | Gourdol |
| 5,590,256 A | 12/1996 | Tchao et al. |
| 5,592,566 A | 1/1997 | Pagallo et al. |
| 5,594,469 A | 1/1997 | Freeman et al. |
| 5,594,640 A | 1/1997 | Capps et al. |
| 5,594,810 A | 1/1997 | Gourdol |
| 5,595,445 A | 1/1997 | Bobry |
| 5,596,697 A | 1/1997 | Foster et al. |
| 5,600,765 A | 2/1997 | Ando et al. |
| 5,602,570 A | 2/1997 | Capps et al. |
| 5,608,778 A | 3/1997 | Partridge, III |
| 5,612,719 A | 3/1997 | Beernink et al. |
| 5,625,833 A | 4/1997 | Levine et al. |
| 5,627,960 A | 5/1997 | Clifford et al. |
| 5,638,092 A | 6/1997 | Eng et al. |
| 5,652,849 A | 7/1997 | Conway et al. |
| 5,656,804 A | 8/1997 | Barkan et al. |
| 5,659,638 A | 8/1997 | Bengtson |
| 5,663,514 A | 9/1997 | Usa |
| 5,663,808 A | 9/1997 | Park et al. |
| 5,668,573 A | 9/1997 | Favot et al. |
| 5,677,710 A | 10/1997 | Thompson-Rohrlich |
| 5,682,439 A | 10/1997 | Beernink et al. |
| 5,684,873 A | 11/1997 | Tiilikainen |
| 5,687,254 A | 11/1997 | Poon et al. |
| 5,692,073 A | 11/1997 | Cass |
| 5,699,441 A | 12/1997 | Sagawa et al. |
| 5,701,424 A | 12/1997 | Atkinson |
| 5,701,497 A | 12/1997 | Yamauchi et al. |
| 5,710,831 A | 1/1998 | Beernink et al. |
| 5,713,045 A | 1/1998 | Berdahl |
| 5,714,698 A | 2/1998 | Tokioka et al. |
| 5,717,846 A | 2/1998 | Iida et al. |
| 5,724,985 A | 3/1998 | Snell et al. |
| 5,732,214 A | 3/1998 | Subrahmanyam |
| 5,732,227 A | 3/1998 | Kuzunuki et al. |
| 5,734,923 A | 3/1998 | Sagawa et al. |
| 5,737,507 A | 4/1998 | Smith |
| 5,745,116 A | 4/1998 | Pisutha-Arnond |
| 5,748,926 A | 5/1998 | Fukuda et al. |
| 5,752,051 A | 5/1998 | Cohen |
| 5,754,308 A | 5/1998 | Lopresti et al. |
| 5,754,939 A | 5/1998 | Herz et al. |
| 5,764,794 A | 6/1998 | Perlin |
| 5,767,457 A | 6/1998 | Gerpheide et al. |
| 5,768,418 A | 6/1998 | Berman et al. |
| 5,768,607 A | 6/1998 | Drews et al. |
| 5,774,357 A | 6/1998 | Hoffberg et al. |
| 5,774,591 A | 6/1998 | Black et al. |
| 5,777,614 A | 7/1998 | Ando et al. |
| 5,781,662 A | 7/1998 | Mori et al. |
| 5,781,723 A | 7/1998 | Yee et al. |

| | | | | | | |
|---|---|---|---|---|---|---|
| 5,784,061 A | 7/1998 | Moran et al. | | 6,040,840 A | 3/2000 | Koshiba et al. |
| 5,784,504 A | 7/1998 | Anderson et al. | | 6,042,012 A | 3/2000 | Olmstead et al. |
| 5,796,866 A | 8/1998 | Sakurai et al. | | 6,049,034 A | 4/2000 | Cook |
| 5,798,693 A | 8/1998 | Engellenner | | 6,049,327 A | 4/2000 | Walker et al. |
| 5,798,758 A | 8/1998 | Harada et al. | | 6,052,481 A | 4/2000 | Grajski et al. |
| 5,799,219 A | 8/1998 | Moghadam et al. | | 6,055,513 A | 4/2000 | Katz et al. |
| 5,805,167 A | 9/1998 | Van Cruyningen | | 6,057,844 A | 5/2000 | Strauss |
| 5,809,172 A | 9/1998 | Melen | | 6,057,845 A | 5/2000 | Dupouy |
| 5,809,267 A | 9/1998 | Moran et al. | | 6,061,050 A | 5/2000 | Allport et al. |
| 5,809,476 A | 9/1998 | Ryan | | 6,064,854 A | 5/2000 | Peters et al. |
| 5,821,925 A | 10/1998 | Carey et al. | | 6,066,794 A | 5/2000 | Longo |
| 5,822,539 A | 10/1998 | Van Hoff | | 6,069,622 A | 5/2000 | Kurlander |
| 5,825,943 A | 10/1998 | DeVito et al. | | 6,072,494 A | 6/2000 | Nguyen |
| 5,832,474 A | 11/1998 | Lopresti et al. | | 6,072,502 A | 6/2000 | Gupta |
| 5,837,987 A | 11/1998 | Koenck et al. | | 6,075,895 A | 6/2000 | Qiao et al. |
| 5,838,326 A | 11/1998 | Card et al. | | 6,078,308 A | 6/2000 | Rosenberg et al. |
| 5,838,889 A | 11/1998 | Booker | | 6,081,629 A * | 6/2000 | Browning .................. 382/313 |
| 5,845,301 A | 12/1998 | Rivette et al. | | 6,085,162 A | 7/2000 | Cherny |
| 5,848,187 A | 12/1998 | Bricklin et al. | | 6,088,484 A | 7/2000 | Mead |
| 5,852,676 A | 12/1998 | Lazar | | 6,088,731 A | 7/2000 | Kiraly et al. |
| 5,861,886 A | 1/1999 | Moran et al. | | 6,092,038 A | 7/2000 | Kanevsky et al. |
| 5,862,256 A | 1/1999 | Zetts et al. | | 6,092,068 A | 7/2000 | Dinkelacker |
| 5,864,635 A | 1/1999 | Zetts et al. | | 6,097,392 A | 8/2000 | Leyerle |
| 5,864,848 A | 1/1999 | Horvitz et al. | | 6,098,106 A | 8/2000 | Philyaw et al. |
| 5,867,150 A | 2/1999 | Bricklin et al. | | 6,104,401 A | 8/2000 | Parsons |
| 5,867,597 A | 2/1999 | Peairs et al. | | 6,104,845 A | 8/2000 | Lipman et al. |
| 5,867,795 A | 2/1999 | Novis et al. | | 6,107,994 A | 8/2000 | Harada et al. |
| 5,880,411 A | 3/1999 | Gillespie et al. | | 6,108,656 A | 8/2000 | Durst et al. |
| 5,880,731 A | 3/1999 | Liles et al. | | 6,111,580 A | 8/2000 | Kazama et al. |
| 5,880,743 A | 3/1999 | Moran et al. | | 6,111,588 A | 8/2000 | Newell |
| 5,884,267 A | 3/1999 | Goldenthal et al. | | 6,115,053 A | 9/2000 | Perlin |
| 5,889,236 A | 3/1999 | Gillespie et al. | | 6,115,482 A | 9/2000 | Sears et al. |
| 5,889,523 A | 3/1999 | Wilcox et al. | | 6,115,724 A | 9/2000 | Booker |
| 5,893,126 A | 4/1999 | Drews et al. | | 6,118,888 A | 9/2000 | Chino et al. |
| 5,893,130 A | 4/1999 | Inoue et al. | | 6,118,899 A | 9/2000 | Bloomfield et al. |
| 5,895,470 A | 4/1999 | Pirolli et al. | | D432,539 S | 10/2000 | Philyaw |
| 5,905,251 A | 5/1999 | Knowles | | 6,128,003 A | 10/2000 | Smith et al. |
| 5,907,328 A | 5/1999 | Brush, II et al. | | 6,138,915 A | 10/2000 | Danielson et al. |
| 5,917,491 A | 6/1999 | Bauersfeld | | 6,144,366 A | 11/2000 | Numazaki et al. |
| 5,920,477 A | 7/1999 | Hoffberg et al. | | 6,147,678 A | 11/2000 | Kumar et al. |
| 5,920,694 A | 7/1999 | Carleton et al. | | 6,151,208 A | 11/2000 | Bartlett |
| 5,932,863 A | 8/1999 | Rathus et al. | | 6,154,222 A | 11/2000 | Haratsch et al. |
| 5,933,829 A | 8/1999 | Durst et al. | | 6,154,723 A | 11/2000 | Cox et al. |
| 5,946,406 A | 8/1999 | Frink et al. | | 6,154,758 A | 11/2000 | Chiang |
| 5,952,599 A | 9/1999 | Dolby et al. | | 6,157,935 A | 12/2000 | Tran et al. |
| 5,953,541 A | 9/1999 | King et al. | | 6,164,534 A | 12/2000 | Rathus et al. |
| 5,956,423 A | 9/1999 | Frink et al. | | 6,167,369 A | 12/2000 | Schulze |
| 5,960,383 A | 9/1999 | Fleischer | | 6,169,969 B1 | 1/2001 | Cohen |
| 5,966,126 A | 10/1999 | Szabo | | 6,175,772 B1 | 1/2001 | Kamiya et al. |
| 5,970,455 A | 10/1999 | Wilcox et al. | | 6,175,922 B1 | 1/2001 | Wang |
| 5,982,853 A | 11/1999 | Liebermann | | 6,181,343 B1 | 1/2001 | Lyons |
| 5,982,929 A | 11/1999 | Ilan et al. | | 6,181,778 B1 | 1/2001 | Ohki et al. |
| 5,986,200 A | 11/1999 | Curtin | | 6,184,847 B1 | 2/2001 | Fateh et al. |
| 5,986,655 A | 11/1999 | Chiu et al. | | 6,192,165 B1 | 2/2001 | Irons |
| 5,990,878 A | 11/1999 | Ikeda et al. | | 6,192,478 B1 | 2/2001 | Elledge |
| 5,990,893 A | 11/1999 | Numazaki | | 6,195,104 B1 | 2/2001 | Lyons |
| 5,991,441 A | 11/1999 | Jourjine | | 6,195,475 B1 | 2/2001 | Beausoleil, Jr. et al. |
| 5,995,643 A | 11/1999 | Saito | | 6,199,048 B1 | 3/2001 | Hudetz et al. |
| 6,002,798 A | 12/1999 | Palmer et al. | | 6,204,852 B1 | 3/2001 | Kumar et al. |
| 6,002,808 A | 12/1999 | Freeman | | 6,208,355 B1 | 3/2001 | Schuster |
| 6,003,775 A | 12/1999 | Ackley | | 6,208,435 B1 | 3/2001 | Zwolinski |
| 6,011,905 A | 1/2000 | Huttenlocher et al. | | 6,215,890 B1 | 4/2001 | Matsuo et al. |
| 6,012,071 A | 1/2000 | Krishna et al. | | 6,218,964 B1 | 4/2001 | Ellis |
| 6,018,342 A | 1/2000 | Bristor | | 6,219,057 B1 | 4/2001 | Carey et al. |
| 6,018,346 A | 1/2000 | Moran et al. | | 6,222,465 B1 | 4/2001 | Kumar et al. |
| 6,021,218 A | 2/2000 | Capps et al. | | 6,229,542 B1 | 5/2001 | Miller |
| 6,021,403 A | 2/2000 | Horvitz et al. | | 6,233,591 B1 | 5/2001 | Sherman et al. |
| 6,025,844 A | 2/2000 | Parsons | | 6,240,207 B1 | 5/2001 | Shinozuka et al. |
| 6,026,388 A | 2/2000 | Liddy et al. | | 6,243,683 B1 | 6/2001 | Peters |
| 6,028,271 A | 2/2000 | Gillespie et al. | | 6,244,873 B1 | 6/2001 | Hill et al. |
| 6,029,195 A | 2/2000 | Herz | | 6,249,292 B1 | 6/2001 | Christian et al. |
| 6,031,525 A | 2/2000 | Perlin | | 6,249,606 B1 | 6/2001 | Kiraly et al. |
| 6,038,342 A | 3/2000 | Bernzott et al. | | 6,252,598 B1 | 6/2001 | Segen |

| | | | | | | |
|---|---|---|---|---|---|---|
| 6,256,400 B1 | 7/2001 | Takata et al. | | 6,509,707 B2 | 1/2003 | Yamashita et al. |
| 6,269,187 B1 | 7/2001 | Frink et al. | | 6,509,912 B1 | 1/2003 | Moran et al. |
| 6,269,188 B1 | 7/2001 | Jamali | | 6,510,387 B2 | 1/2003 | Fuchs et al. |
| 6,270,013 B1 | 8/2001 | Lipman et al. | | 6,510,417 B1 | 1/2003 | Quilici et al. |
| 6,285,794 B1 | 9/2001 | Georgiev et al. | | 6,518,950 B1 | 2/2003 | Dougherty et al. |
| 6,289,304 B1 | 9/2001 | Grefenstette | | 6,522,333 B1 | 2/2003 | Hatlelid et al. |
| 6,304,674 B1 | 10/2001 | Cass et al. | | 6,525,749 B1 | 2/2003 | Moran et al. |
| 6,307,952 B1 | 10/2001 | Dietz | | 6,526,395 B1 | 2/2003 | Morris |
| 6,307,955 B1 | 10/2001 | Zank et al. | | 6,526,449 B1 | 2/2003 | Philyaw et al. |
| 6,310,971 B1 | 10/2001 | Shiiyama et al. | | 6,532,007 B1 | 3/2003 | Matsuda |
| 6,311,152 B1 | 10/2001 | Bai et al. | | 6,538,187 B2 | 3/2003 | Beigi |
| 6,312,175 B1 | 11/2001 | Lum | | 6,539,931 B2 | 4/2003 | Trajkovic et al. |
| 6,313,853 B1 | 11/2001 | Lamontagne et al. | | 6,540,141 B1 | 4/2003 | Dougherty et al. |
| 6,314,457 B1 | 11/2001 | Schena et al. | | 6,542,933 B1 | 4/2003 | Durst, Jr. et al. |
| 6,316,710 B1 | 11/2001 | Lindemann | | 6,543,052 B1 | 4/2003 | Ogasawara |
| 6,317,132 B1 | 11/2001 | Perlin | | 6,545,669 B1 | 4/2003 | Kinawi et al. |
| 6,318,087 B1 | 11/2001 | Baumann et al. | | 6,546,385 B1 | 4/2003 | Mao et al. |
| 6,321,991 B1 | 11/2001 | Knowles | | 6,546,405 B2 | 4/2003 | Gupta et al. |
| 6,323,846 B1 | 11/2001 | Westerman et al. | | 6,549,751 B1 | 4/2003 | Mandri |
| 6,326,962 B1 | 12/2001 | Szabo | | 6,549,891 B1 | 4/2003 | Rauber et al. |
| 6,335,725 B1 | 1/2002 | Koh et al. | | 6,554,433 B1 | 4/2003 | Holler |
| 6,341,280 B1 | 1/2002 | Glass et al. | | 6,560,281 B1 | 5/2003 | Black et al. |
| 6,344,906 B1 | 2/2002 | Gatto et al. | | 6,564,144 B1 | 5/2003 | Cherveny |
| 6,346,933 B1 | 2/2002 | Lin | | 6,570,555 B1 | 5/2003 | Prevost et al. |
| 6,347,290 B1 | 2/2002 | Bartlett | | 6,571,193 B1 | 5/2003 | Unuma et al. |
| 6,351,222 B1 | 2/2002 | Swan et al. | | 6,571,235 B1 | 5/2003 | Marpe et al. |
| 6,356,281 B1 | 3/2002 | Isenman | | 6,573,883 B1 | 6/2003 | Bartlett |
| 6,356,899 B1 | 3/2002 | Chakrabarti et al. | | 6,577,329 B1 | 6/2003 | Flickner et al. |
| 6,363,160 B1 | 3/2002 | Bradski et al. | | 6,577,953 B1 | 6/2003 | Swope et al. |
| RE37,654 E | 4/2002 | Longo | | 6,587,835 B1 | 7/2003 | Treyz et al. |
| 6,366,288 B1 | 4/2002 | Naruki et al. | | 6,593,723 B1 | 7/2003 | Johnson |
| 6,369,811 B1 | 4/2002 | Graham et al. | | 6,594,616 B2 | 7/2003 | Zhang et al. |
| 6,377,296 B1 | 4/2002 | Zlatsin et al. | | 6,594,705 B1 | 7/2003 | Philyaw |
| 6,377,712 B1 | 4/2002 | Georgiev et al. | | 6,597,443 B2 | 7/2003 | Boman |
| 6,377,986 B1 | 4/2002 | Philyaw et al. | | 6,599,130 B2 | 7/2003 | Moehrle |
| 6,378,075 B1 | 4/2002 | Goldstein et al. | | 6,600,475 B2 | 7/2003 | Gutta et al. |
| 6,380,931 B1 | 4/2002 | Gillespie et al. | | 6,610,936 B2 | 8/2003 | Gillespie et al. |
| 6,381,602 B1 | 4/2002 | Shoroff et al. | | 6,615,136 B1 | 9/2003 | Swope et al. |
| 6,384,744 B1 | 5/2002 | Philyaw et al. | | 6,615,268 B1 | 9/2003 | Philyaw et al. |
| 6,384,829 B1 | 5/2002 | Prevost et al. | | 6,617,369 B2 | 9/2003 | Parfondry et al. |
| 6,393,443 B1 | 5/2002 | Rubin et al. | | 6,618,504 B1 | 9/2003 | Yoshino et al. |
| 6,396,523 B1 | 5/2002 | Segal et al. | | 6,618,732 B1 | 9/2003 | White et al. |
| 6,396,951 B1 | 5/2002 | Grefenstette | | 6,622,165 B1 | 9/2003 | Philyaw |
| 6,404,438 B1 | 6/2002 | Hatlelid et al. | | 6,624,833 B1 | 9/2003 | Kumar et al. |
| 6,408,257 B1 | 6/2002 | Harrington et al. | | 6,625,581 B1 | 9/2003 | Perkowski |
| 6,414,671 B1 | 7/2002 | Gillespie et al. | | 6,628,295 B2 | 9/2003 | Wilensky |
| 6,417,797 B1 | 7/2002 | Cousins et al. | | 6,629,133 B1 | 9/2003 | Philyaw et al. |
| 6,418,433 B1 | 7/2002 | Chakrabarti et al. | | 6,630,924 B1 | 10/2003 | Peck |
| 6,421,453 B1 | 7/2002 | Kanevsky et al. | | 6,631,404 B1 | 10/2003 | Philyaw |
| 6,421,675 B1 | 7/2002 | Ryan et al. | | 6,636,763 B1 | 10/2003 | Junker et al. |
| 6,430,554 B1 | 8/2002 | Rothschild | | 6,636,892 B1 | 10/2003 | Philyaw |
| 6,430,567 B2 | 8/2002 | Burridge | | 6,636,896 B1 | 10/2003 | Philyaw |
| 6,433,784 B1 | 8/2002 | Merrick et al. | | 6,638,314 B1 | 10/2003 | Meyerzon et al. |
| 6,434,561 B1 | 8/2002 | Durst, Jr. et al. | | 6,638,317 B2 | 10/2003 | Nakao et al. |
| 6,434,581 B1 | 8/2002 | Forcier | | 6,643,692 B1 | 11/2003 | Philyaw et al. |
| 6,438,523 B1 | 8/2002 | Oberteuffer et al. | | 6,650,761 B1 | 11/2003 | Rodriguez et al. |
| 6,448,979 B1 | 9/2002 | Schena et al. | | 6,651,053 B1 | 11/2003 | Rothschild |
| 6,449,616 B1 | 9/2002 | Walker et al. | | 6,658,151 B1 | 12/2003 | Lee et al. |
| 6,454,626 B1 | 9/2002 | An | | 6,661,919 B2 | 12/2003 | Nicholson et al. |
| 6,460,036 B1 | 10/2002 | Herz | | 6,664,991 B1 | 12/2003 | Chew et al. |
| 6,466,198 B1 | 10/2002 | Feinstein | | 6,671,684 B1 * | 12/2003 | Hull et al. ............ 707/6 |
| 6,476,830 B1 | 11/2002 | Farmer et al. | | 6,677,969 B1 | 1/2004 | Hongo |
| 6,476,834 B1 | 11/2002 | Doval et al. | | 6,678,664 B1 | 1/2004 | Ganesan |
| 6,477,239 B1 | 11/2002 | Ohki et al. | | 6,681,031 B2 | 1/2004 | Cohen et al. |
| 6,483,513 B1 | 11/2002 | Haratsch et al. | | 6,686,844 B2 | 2/2004 | Watanabe et al. |
| 6,484,156 B1 | 11/2002 | Gupta et al. | | 6,687,612 B2 | 2/2004 | Cherveny |
| 6,486,874 B1 | 11/2002 | Muthuswamy et al. | | 6,688,081 B2 | 2/2004 | Boyd |
| 6,486,892 B1 | 11/2002 | Stern | | 6,688,522 B1 | 2/2004 | Philyaw et al. |
| 6,489,970 B1 | 12/2002 | Pazel | | 6,688,523 B1 | 2/2004 | Koenck |
| 6,498,970 B2 | 12/2002 | Colmenarez et al. | | 6,688,525 B1 | 2/2004 | Nelson et al. |
| 6,504,138 B1 | 1/2003 | Mangerson | | 6,690,358 B2 | 2/2004 | Kaplan |
| 6,507,349 B1 | 1/2003 | Balassanian | | 6,691,123 B1 | 2/2004 | Gulliksen |
| 6,508,706 B2 | 1/2003 | Sitrick et al. | | 6,691,151 B1 | 2/2004 | Cheyer et al. |

| | | |
|---|---|---|
| 6,691,194 B1 | 2/2004 | Ofer |
| 6,691,914 B2 * | 2/2004 | Isherwood et al. .......... 235/375 |
| 6,692,259 B2 | 2/2004 | Kumar et al. |
| 6,694,356 B1 | 2/2004 | Philyaw |
| 6,697,838 B1 | 2/2004 | Jakobson |
| 6,697,949 B1 | 2/2004 | Philyaw et al. |
| H2098 H | 3/2004 | Morin |
| 6,701,354 B1 | 3/2004 | Philyaw et al. |
| 6,701,369 B1 | 3/2004 | Philyaw |
| 6,704,024 B2 | 3/2004 | Robotham et al. |
| 6,704,699 B2 | 3/2004 | Nir et al. |
| 6,707,581 B1 | 3/2004 | Browning |
| 6,708,208 B1 | 3/2004 | Philyaw |
| 6,718,308 B1 | 4/2004 | Nolting |
| 6,720,984 B1 | 4/2004 | Jorgensen et al. |
| 6,721,921 B1 | 4/2004 | Altman |
| 6,725,125 B2 | 4/2004 | Basson et al. |
| 6,725,203 B1 | 4/2004 | Seet et al. |
| 6,725,260 B1 | 4/2004 | Philyaw |
| 6,728,000 B1 | 4/2004 | Lapstun et al. |
| 6,735,632 B1 | 5/2004 | Kiraly et al. |
| 6,741,745 B2 | 5/2004 | Dance et al. |
| 6,744,938 B1 | 6/2004 | Rantze et al. |
| 6,745,234 B1 | 6/2004 | Philyaw et al. |
| 6,747,632 B2 | 6/2004 | Howard |
| 6,750,852 B2 | 6/2004 | Gillespie et al. |
| 6,752,498 B2 | 6/2004 | Covannon et al. |
| 6,753,883 B2 | 6/2004 | Schena et al. |
| 6,754,632 B1 | 6/2004 | Kalinowski et al. |
| 6,754,698 B1 | 6/2004 | Philyaw et al. |
| 6,757,715 B1 | 6/2004 | Philyaw |
| 6,758,398 B1 | 7/2004 | Philyaw et al. |
| 6,760,661 B2 | 7/2004 | Klein et al. |
| 6,766,494 B1 | 7/2004 | Price et al. |
| 6,772,047 B2 | 8/2004 | Butikofer |
| 6,772,338 B1 | 8/2004 | Hull |
| 6,773,177 B2 | 8/2004 | Denoue et al. |
| 6,778,988 B2 | 8/2004 | Bengtson |
| 6,786,793 B1 | 9/2004 | Wang |
| 6,788,809 B1 | 9/2004 | Grzeszczuk et al. |
| 6,788,815 B2 | 9/2004 | Lui et al. |
| 6,791,536 B2 | 9/2004 | Keely et al. |
| 6,791,588 B1 | 9/2004 | Philyaw |
| 6,792,112 B1 | 9/2004 | Campbell et al. |
| 6,792,452 B1 | 9/2004 | Philyaw |
| 6,798,429 B2 | 9/2004 | Bradski |
| 6,801,637 B2 | 10/2004 | Voronka et al. |
| 6,804,396 B2 | 10/2004 | Higaki et al. |
| 6,804,659 B1 | 10/2004 | Graham et al. |
| 6,813,039 B1 | 11/2004 | Silverbrook et al. |
| 6,816,894 B1 | 11/2004 | Philyaw et al. |
| 6,822,639 B1 | 11/2004 | Silverbrook et al. |
| 6,823,388 B1 | 11/2004 | Philyaw et al. |
| 6,824,044 B1 | 11/2004 | Lapstun et al. |
| 6,824,057 B2 | 11/2004 | Rathus et al. |
| 6,825,956 B2 | 11/2004 | Silverbrook et al. |
| 6,826,592 B1 | 11/2004 | Philyaw et al. |
| 6,827,259 B2 | 12/2004 | Rathus et al. |
| 6,827,267 B2 | 12/2004 | Rathus et al. |
| 6,829,650 B1 | 12/2004 | Philyaw et al. |
| 6,830,187 B2 | 12/2004 | Rathus et al. |
| 6,830,188 B2 | 12/2004 | Rathus et al. |
| 6,832,116 B1 | 12/2004 | Tillgren et al. |
| 6,833,936 B1 | 12/2004 | Seymour |
| 6,834,804 B2 | 12/2004 | Rathus et al. |
| 6,836,799 B1 | 12/2004 | Philyaw et al. |
| 6,879,957 B1 | 4/2005 | Pechter et al. |
| 6,880,122 B1 | 4/2005 | Lee et al. |
| 6,886,104 B1 | 4/2005 | McClurg et al. |
| 6,898,592 B2 | 5/2005 | Peltonen et al. |
| 6,931,592 B1 | 8/2005 | Ramaley et al. |
| 6,938,024 B1 | 8/2005 | Horvitz |
| 6,947,571 B1 | 9/2005 | Rhoads et al. |
| 6,947,930 B2 | 9/2005 | Anick et al. |
| 6,970,915 B1 | 11/2005 | Partovi et al. |
| 6,993,580 B1 | 1/2006 | Isherwood et al. |
| 7,043,489 B1 | 5/2006 | Kelley |
| 7,051,943 B2 | 5/2006 | Leone et al. |
| 7,057,607 B2 | 6/2006 | Mayoraz et al. |
| 7,062,706 B2 | 6/2006 | Maxwell et al. |
| 7,096,218 B2 | 8/2006 | Schirmer et al. |
| 7,103,848 B2 | 9/2006 | Barsness et al. |
| 7,110,576 B2 | 9/2006 | Norris, Jr. et al. |
| 7,121,469 B2 | 10/2006 | Dorai et al. |
| 7,130,885 B2 | 10/2006 | Chandra et al. |
| 7,136,814 B1 | 11/2006 | McConnell |
| 7,174,054 B2 | 2/2007 | Manber et al. |
| 7,224,820 B2 | 5/2007 | Inomata et al. |
| 7,240,843 B2 | 7/2007 | Paul et al. |
| 7,246,118 B2 | 7/2007 | Chastain et al. |
| 7,263,521 B2 | 8/2007 | Carpentier et al. |
| 7,275,049 B2 | 9/2007 | Clausner et al. |
| 7,299,186 B2 | 11/2007 | Kuzunuki et al. |
| 7,299,969 B2 | 11/2007 | Paul et al. |
| 2001/0001854 A1 | 5/2001 | Schena et al. |
| 2001/0003176 A1 | 6/2001 | Schena et al. |
| 2001/0003177 A1 * | 6/2001 | Schena et al. ................ 705/27 |
| 2001/0032252 A1 | 10/2001 | Durst et al. |
| 2001/0049636 A1 | 12/2001 | Hudda et al. |
| 2001/0053252 A1 | 12/2001 | Creque |
| 2002/0002504 A1 | 1/2002 | Engel et al. |
| 2002/0013781 A1 | 1/2002 | Petersen |
| 2002/0016750 A1 | 2/2002 | Attia |
| 2002/0023158 A1 | 2/2002 | Polizzi et al. |
| 2002/0023215 A1 | 2/2002 | Wang et al. |
| 2002/0023959 A1 | 2/2002 | Miller et al. |
| 2002/0029350 A1 | 3/2002 | Cooper et al. |
| 2002/0038456 A1 | 3/2002 | Hansen et al. |
| 2002/0051262 A1 | 5/2002 | Nuttall et al. |
| 2002/0052747 A1 | 5/2002 | Sarukkai |
| 2002/0055906 A1 | 5/2002 | Katz et al. |
| 2002/0075298 A1 | 6/2002 | Schena et al. |
| 2002/0090132 A1 | 7/2002 | Boncyk et al. |
| 2002/0091569 A1 | 7/2002 | Kitaura et al. |
| 2002/0102966 A1 | 8/2002 | Lev et al. |
| 2002/0133725 A1 | 9/2002 | Roy et al. |
| 2002/0135815 A1 | 9/2002 | Finn |
| 2002/0161658 A1 | 10/2002 | Sussman |
| 2002/0194143 A1 | 12/2002 | Banerjee et al. |
| 2003/0001018 A1 | 1/2003 | Hussey et al. |
| 2003/0009495 A1 | 1/2003 | Adjaoute |
| 2003/0028889 A1 | 2/2003 | McCoskey et al. |
| 2003/0040957 A1 | 2/2003 | Rodriguez et al. |
| 2003/0046307 A1 | 3/2003 | Rivette et al. |
| 2003/0050854 A1 | 3/2003 | Showghi et al. |
| 2003/0093384 A1 | 5/2003 | Durst et al. |
| 2003/0098352 A1 | 5/2003 | Schnee et al. |
| 2003/0130904 A1 | 7/2003 | Katz et al. |
| 2003/0132298 A1 | 7/2003 | Swartz et al. |
| 2003/0144865 A1 | 7/2003 | Lin et al. |
| 2003/0150907 A1 | 8/2003 | Metcalf et al. |
| 2003/0179908 A1 | 9/2003 | Mahoney et al. |
| 2003/0187886 A1 | 10/2003 | Hull et al. |
| 2003/0200152 A1 | 10/2003 | Divekar |
| 2003/0214528 A1 | 11/2003 | Pierce et al. |
| 2003/0218070 A1 | 11/2003 | Tsikos et al. |
| 2004/0015606 A1 | 1/2004 | Philyaw |
| 2004/0036718 A1 | 2/2004 | Warren et al. |
| 2004/0042667 A1 | 3/2004 | Lee et al. |
| 2004/0044952 A1 | 3/2004 | Jiang et al. |
| 2004/0052400 A1 | 3/2004 | Inomata et al. |
| 2004/0059779 A1 | 3/2004 | Philyaw |
| 2004/0073708 A1 | 4/2004 | Warnock |
| 2004/0073874 A1 | 4/2004 | Poibeau et al. |
| 2004/0075686 A1 * | 4/2004 | Watler et al. ................ 345/749 |
| 2004/0078749 A1 | 4/2004 | Hull et al. |

| | | | |
|---|---|---|---|
| 2004/0121815 A1 | 6/2004 | Fournier et al. | |
| 2004/0122811 A1 | 6/2004 | Page | |
| 2004/0128514 A1 | 7/2004 | Rhoads | |
| 2004/0158492 A1 | 8/2004 | Lopez et al. | |
| 2004/0186859 A1 | 9/2004 | Butcher | |
| 2004/0199615 A1 | 10/2004 | Philyaw | |
| 2004/0206809 A1 | 10/2004 | Wood et al. | |
| 2004/0208369 A1 | 10/2004 | Nakayama | |
| 2004/0208372 A1 | 10/2004 | Boncyk et al. | |
| 2004/0210943 A1 | 10/2004 | Philyaw | |
| 2004/0217160 A1 | 11/2004 | Silverbrook et al. | |
| 2004/0220975 A1 | 11/2004 | Carpentier et al. | |
| 2004/0229194 A1 | 11/2004 | Yang | |
| 2004/0230837 A1 | 11/2004 | Philyaw et al. | |
| 2004/0243601 A1 | 12/2004 | Toshima | |
| 2004/0256454 A1 | 12/2004 | Kocher | |
| 2004/0258275 A1 | 12/2004 | Rhoads | |
| 2004/0260470 A1 | 12/2004 | Rast | |
| 2004/0260618 A1 | 12/2004 | Larson | |
| 2004/0267734 A1 | 12/2004 | Toshima | |
| 2005/0005168 A1 | 1/2005 | Dick | |
| 2005/0076095 A1 | 4/2005 | Mathew et al. | |
| 2005/0086309 A1 | 4/2005 | Galli et al. | |
| 2005/1008630 * | 4/2005 | Galli et al. ................. | 709/206 |
| 2005/0144074 A1 | 6/2005 | Fredregill et al. | |
| 2005/0149516 A1 | 7/2005 | Wolf et al. | |
| 2005/0149538 A1 | 7/2005 | Singh et al. | |
| 2005/0228683 A1 | 10/2005 | Saylor et al. | |
| 2005/0278179 A1 | 12/2005 | Overend et al. | |
| 2006/0069616 A1 | 3/2006 | Bau | |
| 2006/0075327 A1* | 4/2006 | Sriver ...................... | 715/501.1 |
| 2006/0080314 A1 | 4/2006 | Hubert et al. | |
| 2006/0126131 A1 | 6/2006 | Tseng et al. | |
| 2007/0005570 A1 | 1/2007 | Hurst-Hiller et al. | |
| 2007/0061146 A1 | 3/2007 | Jaramillo et al. | |
| 2007/0099636 A1 | 5/2007 | Roth | |
| 2007/0170248 A1 | 7/2007 | Brundage et al. | |
| 2007/0208561 A1 | 9/2007 | Choi et al. | |
| 2007/0208732 A1 | 9/2007 | Flowers et al. | |
| 2007/0249406 A1 | 10/2007 | Andreasson | |
| 2008/0071775 A1 | 3/2008 | Gross | |

FOREIGN PATENT DOCUMENTS

| | | |
|---|---|---|
| EP | 0544434 | 6/1993 |
| EP | 0596247 | 5/1994 |
| EP | 1141882 | 10/2001 |
| EP | 1398711 | 3/2004 |
| JP | 3260768 | 11/1991 |
| JP | 10-133847 | 5/1998 |
| JP | 2003216631 | 7/2003 |
| WO | WO 9803923 A1 * | 1/1998 |
| WO | WO-00/67091 | 11/2000 |
| WO | WO-02/11446 A2 | 2/2002 |
| WO | WO-02/091233 A2 | 11/2002 |
| WO | WO-2004/084109 | 9/2004 |
| WO | WO-2005/071665 A1 | 8/2005 |
| WO | WO-2008/002074 | 1/2008 |

OTHER PUBLICATIONS

10. Toshifumi Arai, Dietmar Aust and Scott E. Hudson, "PaperLink: A Technique for Hyperlinking from Real Paper to Electronic Content," Proceedings of CHI'97, taken from the cited references of US Patent 6,671,684 to Hull et al.*

U.S. Appl. No. 10/676,881, Lee et al.

U.S. Appl. No. 60/201,570, Bengston.

Agilent Technologies. "Agilent ADNK-2133 Optical Mouse Designer's Kit: Product Overview." 2004, 6 pp.

Airclic. "Products." http://www.airclic.com/products.asp, accessed Oct. 3, 2005, 3pp.

Arai, Toshifumi , Dietmar Aust. Scott E. Hudson. "Paperlink: A Technique for Hyperlinking From Real Paper to Electronic Content." *Proceedings of the ACM Conference on Human Factors in Computing Systems (CHI 97)*, Addison-Wesley, Apr. 1997, pp. 327-334.

Aust, Dietrnar. "Augmenting Paper Documents with Digital Information in a Mobile Environment" MS Thesis, University of Dortmund, Department of Computer Graphics, 1996. 47pp.

Bai, Zhen-Long, and Qiang Huo "An Approach to Extracting the Target Text Line from a Document Image Captured by a Pen Scanner." *Proceedings of the Seventh International Conference on Document Analysis and Recognition (ICDAR 2003)*, 2003, 5 pp.

Bell, Timothy, Ian H. Witten, John G. Cleary. "Modeling for Text Compression." *ACM Computing Surveys*, vol. 21, No. 4, Dec. 1989, pp. 557-591.

Bentley, Jon L. and Robert Sedgewick. "Fast Algorithms for Sorting and Searching Strings." *Proceedings of the 10th ACM-SIAM Symposium on Discrete Algorithms*, New York, NY: ACM Press, 1997, pp. 360-369.

Burle Technical Memorandum. "Fiber Optics: Theory and Applications." http://www.burle.com/cgi-bin/byteserver.pl/pdf/100r.pdf, 19pp.

C Technologies AB. "CPEN User's Guide." Jan. 2001, 130pp.

C Technologies AB. "User's Guide for C-Pen 10." Aug. 2001, 128pp.

Capobianco, Robert A. "Design Considerations for. Optical Coupling of Flashlamps and Fiber Optics." PerkinElmer, 1998-2003. .http://optoelectronics.perkineimer.com/content/whitepapers/OpticalCoupling.pdf, 12 pp.

CASIO Computer Co. Ltd, ALPS Electric Co., Ltd. "Alliance Agreement on Development and Mass Production of Fingerprint Scanner for Mobile Devices." Press Release, Feb. 25, 2003. http://world.casio.com/pacific/news/2003/fingerprint.html, 2pp.

Cenker, Christian. "Wavelet Packets and Optimization in Pattern Recognition." *Proceedings of the 21st International Workshop of the AAPR*, Hallstatt, Austria, May 1997, 11pp.

Clancy, Heather. "Cell Phones Get New Job: Portable Scanning." C/Net News.com, http://news.com.com/2102-1039_5572897.html?tag=st.util.print, Accessed Feb. 13. 2005, 3pp.

Cybertracker. Homepage. http:/www.cybertracker.co.za/, accessed Oct. 3, 2005, 2pp.

Digital Convergence. "CueCat." www.cuecat.com, accessed Oct. 3, 2005, 2 pp.

Docuport "DocuPen Operating Manual." Montreal, Quebec, 2004, 48pp.

Doermann, David, Huiping Li, Omid Kia, Kemal Kilic. "The Detection of Duplicates in Document Image Databases." Technical Report. LAMP-TR-005/CAR-TR-850/CS-TR-3739, University of Maryland College Park, Feb. 1997, 39pp.

Doerrnann, David. "The Indexing and Retrieval of Document Images: A Survey." Technical Report. LAMP-TR-0013/CAR-TR-878/CS-TR-3876. University of Maryland College Park, Feb. 1998, 39pp.

Doermann, David, J. Sauvola, H. Kauniskangas, C. Shin, M. Pietikäinen & A. Rosenfeld. "The Development of a General Framework for Intelligent Document Image Retrieval." *Series in Machine Perception and Artificial Intelligence*, vol. 29; Document Analysis Systems II, Washington DC: World Scientific Press, 1997, 28 pp.

Duong, Jean, Myriam Côté, Hubert Emptoz, Ching Y. Suen. "Extraction of Text Areas in Printed Document Images." *Proceedings of the 2001 ACM Symposium on Document Engineering*. New York, NY: ACM Press, 2001, pp. 157-164.

Erol, Bema, Jonathan J. Hull, and Dar-Shyang Lee. "Linking Multimedia Presentations with their Symbolic Source Documents: Algorithm and Applications." *ACM Multimedia*, New York, NY: ACM Press, 2003, 10pp.

Fall, C.J., A Törcsvári, K. Benzineb, G. Karetka. "Automated Categorization in the International Patent Classification." *ACM SIGIR Forum*. vol. 37, Issue 1, Spring 2003: 10-25.

Ficstar. Homepage. www.ficstar.com, accessed Oct. 4. 2005, 1p.

Fitzgibbon, Andrew, and Ehud Reiter. "Memories for Life: Managing Information Over a Human Lifetime." UK Computing Research Committee's Grand Challenges in Computing Workshop, May 22, 2003. 8pp.

Ghani, Rayid, Rosie Jones, and Dunja Mladenić. "Mining the Web to Create Minority Language Corpora." Proceedings of the 10th International Conference on Information and Knowledge Management (CIKM). Atlanta, Georgia, Nov. 5-10, 2001, pp. 279-286.

Google. "Google Search Appliance—Intranets." http://www.google.com/appliance/pdf/ds_GSA_intranets.pdf, 2004, 2 pp.

Google. "Simplicity and Enterprise Search.". 2003 http://www.google.com/enterprise/pdf/google_simplicity_enterprise_wp.pdf, 7pp.

Graham, Jamey, Berna Erol, Jonathan J. Hull. and Dar-Shyang Lee. "The Video Paper Multimedia Playback System." *Proceedings of the Eleventh ACM International Conference on Multimedia*. New York, NY: ACM Press, 2003, pp. 94-95.

Grossman, David A, Ophir Frieder, Nazli Goharian "Token Identification" Slideshow. 2002, 15 pp.

Guimbretière, François. "Paper Augmented Digital Documents." *Proceedings of Annual ACM Symposium on User Interface Software and Technology* New York , NY: ACM Press, 2003, 10pp.

Hand Held Products "The HHP Imageteam (IT) 4410 and 4410ESD." Brochure, 2pp.

Hansen, Jesse. "A Matlab Project in Optical Character Recognition (OCR)." DSP Lab, University of Rhode Island. May 15, 2002, 6pp.

Heiner,Jeremy M. , Scott E. Hudson, Kenichiro Tanaka. "Linking and Messaging from Real Paper in the Paper PDA." *ACM Symposium on User Interface Software and Technology*. New York, NY: ACM Press, 1999, pp. 179-186.

Hewlett-Packard Company. "HP Capshare 920 Portable E-Copier and Information Appliance User Guide, First Edition," 1999. 42 pp.

Hjaltason, Gísli R. and Hanan Samet. "Distance Browsing in Spatial Databases." *ACM Transactions on Database Systems*. vol. 24, No. 2, Jun. 1999: 265-318.

Hong, Tao and Jonathan H. Hull. "Degraded Text Recognition Using Word Collocation and Visual Inter-Word Constraints." *Fourth ACL Conference on Applied Natural Language Processing*, Stuttgart, Germany, 1994, 2pp.

Hopkins, George W., and Tad D. Simons. "A Semi-Imaging Light Pipe for Collecting Weakly Scattered Light." Hewlett Packard Company, Jun. 1998, 6 pp.

Hu, Jianying, Ramanujan Kashi, Gordon Witfong, "Comparison and Classification of Documents Based on Layout Similarity." Lucent Technologies Bell Labs, Murray Hill, NJ, 2000, 21pp.

Hull, Jonathan J, and Dar-Shyang Lee. "Simultaneous Highlighting of Paper and Electronic Documents." *Proceedings of the International Conference on Pattern Recognition (ICPR '00)*, vol. 4. Barcelona, 2000, 4401-4404.

Hull, Jonathan J, Dar-Shyang Lee, John Cullen, Peter E. Hart. "Document Analysis Techniques for the Infinite Memory Multifunction Machine." DEXA Workshop, 1999. http://www.informatik.uni-trier.de/~ley/db/conf/dexaw/dexaw99.html. 5pp.

Inglis, Stuart and Ian H. Witten. "Compression-Based Template Matching." University of Waikato, Hamilton, New Zealand, 1994, 10 pp.

IPValue Management, Xerox Research Centre Europe. "Technology Licensing Opportunity: Xerox Mobile Camera Document Imaging." Slideshow, Mar. 1, 2004, 11pp.

IRIS. "IRIS Business Card Reader II." Brochure. 2 pp.

IRIS. "IRIS Pen Executive." Brochure, 2 pp.

ISRI Staff. "OCR Accuracy Produced By the Current DOE Document Conversion System." Technical Report 2002-06, Information Science Research Institute at the University of Nevada, Las Vegas. May 2002, 9pp.

Jainschigg, John and Richard "Zippy" Grigonis, "M-Commerce Alternatives," Communications Convergence.com, http://www.cconvergence.com/shared/article/showArticle.jhtml?articleId=8701069, May 7, 2001, 14pp.

Janesick, James. "Dueling Detectors." *Spie's OE Magazine*. Feb. 2002: 30-33.

Jenny. Reinhard. "Fundamentals of Fiber Optics: An Introduction for Beginners." Technical Report for Volpi AG, Apr. 26, 2000. http://www.volpiusa.com/whitepapers/FundamentalsofFiberOptics.pdf, 23pp.

Kahan, José and Marja-Riitta Koivunen. "Annotea: An Open RDF Infrastructure for Shared Web Annotations." Proceedings of the 10th International World Wide Web Conference, Hong Kong, 2001. http://www10.org/cdrom/papers/frame.html, pp. 623-632.

Kasabach, Chris, Chris Pacione, John Stivoric, Francine Gemperle, Dan Siewiorek. "Digital Ink: A Familiar Idea with Technological Might!" *CHI 1998 Conference*. New York, NY: ACM Press, 1998, pp. 175-176.

Keytronic. "F-SCAN-S001US Stand Alone Fingerprint Scanner." http://www.keytronic.com/home/shop/Productlist.asp?CATID=62&SubCATID=1. accessed Oct. 4, 2005, 2pp.

Khoubyari, Siamak. "The Application of Word Image Matching in Text Recognition." MS Thesis, State University of New York at Buffalo. Jun. 1992. 107pp.

Kia, Omid and David Doerman. "Integrated Segmentation and Clustering for Enhanced Compression of Document Images." International Conference on Document Analysis and Recognition, Ulm Germany Aug. 18-20, 1997 vol. 1. 6 pp.

Kia, Omid E. "Document Image Compression and Analysis." PhD Thesis, University of Maryland at College Park, 1997, 141pp.

Kia, Omid, David Doerman, Azriel Rosenfeld, Rama Chellappa. "Symbolic Compression and Processing of Document Images." Technical Report: LAMP-TR-004/CFAR-TR-849/CS-TR-3734, University of Maryland, College Park, Jan. 1997, 36pp.

Kia, Omid. "Integrated Segmentation and Clustering for Enhanced Compression of Document Images." International Conference on Document Analysis and Recognition, Ulm, Germany, Aug. 18-20, 1997, 7pp.

Kopec, Gary E. "Multilevel Character Templates for Document Image Decoding." IS&T/SPIE 1997 International Symposium on Electronic Imaging: Science & Technology , San Jose, CA, Feb 8-14, 1997, 10pp.

Kopec, Gary E., Maya R. Said, Kris Popat. "N-Gram Language Models for Document Image Decoding." *Proceedings of IS&T/SPIE Electronics Imaging 2002: Document Recognition and Retrieval IX*, vol. 4670-20, Jan. 2002. 12pp.

Kukich, Karen. "Techniques for Automatically Correcting Words in Text." *ACM Computing Surveys*, vol. 24, No. 4, Dec. 1992: pp. 377-439.

Lee, Bongsoo, Won Y. Choi, James K. Walker. "Ultrahigh-Resolution Plastic Graded-index fused Image Plates." *Optics Letters*, vol. 24, No. 10, May 15, 2000: 719-721.

Lee, D.L., and F.H. Lochovsky. "Voice Response Systems." *ACM Computing Surveys*, vol. 15, Issue 4, Dec. 1983: pp. 351-374.

Lee, Dar-Shyang and Jonathan J. Hull. "Detecting Duplicates Among Symbolically Compressed Images in a Large Document Database." *Pattern Recognition Letters*, No. 22, 2001: 545-550.

Lee, Dar-Shyang and Jonathan J. Hull. "Duplicate Detection for Symbolically Compressed Documents." Fifth International Conference on Document Analysis and Recognition (ICDAR), 1999, 4pp.

Lee, Dar-Shyang. "Substitution Deciphering Based on HMMs with Applications to Compressed Document Processing." *IEEE Transactions on Pattern Analysis and Machine Intelligence*, vol. 24, No. 12.. Washington DC: IEEE Computer Society, Dec. 2002, pp. 1661-1666.

Lesher, G.W., Moulton, B.J. & Higginbotham, D.J. (1999) "Effects of Ngram Order and Training Text Size on Word Prediction." Proceedings of the RESNA '99 Annual Conference, 1999, 3pp.

Lieberman, Henry. "Out of Many, One: Reliable Results from Unreliable Recognition." ACM Conference on Human Factors in Computing Systems (CHI 2002); Apr. 20-25, 2002; Minneapolis; MN; 2 pp.

Lightsource Picture.

Liu, Lon-Mu, Yair M. Babad, Wei Sun, and Ki-Kan Chan. "Adaptive Post-Processing of OCR Text Via Knowledge Acquisition." *Proceedings of the ACM 1991 Computer Science Conference*. New York, NY: ACM Press, 1991, pp. 558-569.

Ljungstrand, Peter, Johan Redstrom, and Lars Erik Holmquist "Webstickers: Using Physical Tokens to Access, Manage, and Share Bookmarks to the Web." Proceedings of Designing Augmented Reality Environments 2000, Elsinore, Denmark, Apr. 12-14, 2000, pp. 23-31.

LTI Computer Vision Library "LTI Image Processing Library Developer's Guide. Version 29.10.2003." Aachen, Germany, 2002, 45 pp.

Manolescu, Dragos-Anton. "Feature Extraction—A Pattern for Information Retrieval" *Proceedings of the 5th Pattern Languages of Programming*, Monticello, Illinois, Aug. 1998, 18pp.

McNamee, Paul, James Mayfield. Christine Piatko. "Haircut: A System for Multilingual Text Retrieval in Java." *Journal of Computing Sciences in Small Colleges*. vol. 17, Issue 2, Feb. 2002: 8-22.

Mind Like Water. "Collection Creator." www.collectioncreator.com, accessed Oct. 2, 2005, 3pp.

Muddu, Prashant. "A Study of Image Transmission Through a Fiber-Optic Conduit and its Enhancement Using Digital Image Processing Techniques." Thesis, Florida State College of Engineering, Nov. 18, 2003, 93 pp.

Munich, Mario E. and Pietro Perona. "Visual Input for Pen-Based Computers." *Proceedings of the International Conference on Pattern Recognition (ICPR '96)* vol. III. Los Alamitos, CA: IEEE CS Press. Jun. 1996, 5pp.

Murdoch, Gregary and Nicholas Kushmerick. "Mapping Physical Artifacts to their Web Counterparts: A Case Study with Products Catalogs." MHCI-2004 Workshop on Mobile and Ubiquitous Information Access (Strathclyde, UK). 2004. 7pp.

Nabeshima, Shinji, Shinichirou Yamamoto, Kiyoshi Agusa, Toshio Taguchi. "Memo-Pen: A New Input Device." *CHI '95 Proceedings Short Papers*, New York, NY: ACM Press, 1995, pp. 256-257.

Nautilus Hyosung. "New Software for Automated Teller Machines." http://www.nautilus.hysoung.com/product_service/software_software05.html, accessed Oct. 4, 2005, 3pp.

Neomedia Technologies "Paperclick for Cellphones." 2004. brochure 2pp.

Neomedia Technologies "Paperclick Linking Services." Brochure. 2004, 1 page.

Neomedia Technologies. "For Wireless Communication Providers." Brochure. 2004, 1 page.

Neville, Sean. "Project Atom, Amazon, Mobile Web Services, and Fireflies at REST" Artima Weblogs, http://www.artima.com/weblogs/viewpost.jsp?thread=18731, Oct. 24, 2003, 4pp.

Newman, William and Pierre Wellner. "A Desk Supporting Computer-based Interaction with Paper Documents." *Proceedings of ACM CHI'92 Conference on Human Factors in Computing Systems*. New York, NY: ACM Press, 1992, pp. 587-592.

Newman, William. "Document DNA: Camera Image Processing." 4pp.

NSG America, Inc. "SELFOC Lens Arrays for Line Scanning Applications." *Intelligent Opto Sensor Designer's Notebook*, No. 2, 5 pp.

ONClick Corporation. "VIA Mouse VIA-251." Brochure, 2pp.

Pal, U. S. Sinha, and B.B. Chaudhuri. "Multi-Oriented Text Lines Detection and Their Skew Estimation." Indian Conference on Computer Vision, Graphics, and Image Processing, Ahmedabad, India, Dec. 16-18, 2002, 6pp.

Peacocks MD&B. "Peacocks MD&B, Releases Latest hands and Eyes Free Voice Recognition Barcode Scanner." http://www.peacocks.com.au/store/page.pl?id=457, Dec. 5, 2004, 2pp.

Peterson, James L. "Detecting and Correcting Spelling Errors." *Communications of the ACM*, vol. 23 No. 12, Dec. 1980, pp. 676-687.

Planon Systems Solutions. "Docupen 700." www.docupen.com, accesssed Oct. 3, 2005.

Podio, Fernando L. "Biometrics—Technologies For Highly Secure Personal Authentication," National Institute of Standards and Technology, http://whitepapers.zdnet.com/search.aspx?compid=3968, May 2001, 8pp.

Precise Biometrics. "Precise 200 MC." http://www.precisebiometrics.com/data/content/DOCUMENTS/200592691619553200%20MC.pdf. accessed Oct. 4, 2005, 2pp.

Price, Morgan N, Gene Golovchinsky, Bill N. Schilit. "Linking by Inking: Trailblazing in a Paper-like Hypertext." *Proceedings of Hypertext '98*. Pittsburgh, PA: ACM Press, 1998, 10 pp.

Psion Teklogix. "Workabout Pro." http://www.psionteklogix.com/public.aspx?s=uk&p=Products&pCat=128&pID=1058, accessed Oct. 3, 2005, 2pp.

Rao, Ramana, Stuart K. Card, Walter Johnson, Leigh Klotz, and Randall H. Trigg. "Protofoil: Storing and Finding the Information Worker's Paper Documents in an Electronic File Cabinet." *Proceedings of the ACM SIGCHI Conference on Human Factors in Computing Systems*. New York, NY: ACM Press, 1994, pp. 180-185, 477.

Roberts, David A. and Richard R.A. Syms. "1D and 2D Laser Line Scan Generation Using a Fibre Optic Resonant Scanner." Department of Electronic and Electrical Engineering, Imperial College of Science Technology and Medicine, 2003, 11pp.

Rus, Daniela, and Devika Subramanian. "Multi-media RISSC Informatics: Retrieving Information with Simple Structural Components." *Proceedings of the Second International Conference on Information and Knowledge Management*. New York, NY: 1993, pp. 283-294.

Samet Hanan. "Data Structures for Quadtree Approximation and Compression." *Communications of the ACM*, vol. 28, No. 9, Sep. 1985: pp. 973-993.

Sanderson, Mark and C.J. Van Rijsbergen. "The Impact on Retrieval Effectiveness of Skewed Frequency Distributions." *ACM Transactions on Informations Systems*, vol. 17, No. 4, Oct. 1999: pp. 440-465.

Schilit, Bill N. Gene Golovchinsky. Morgan N. Price. "Beyond Paper: Supporting Active Reading with Free Form Digital Ink Annotations." *Proceedings of CHI 98*, new York, NY: ACM Press, 1998, 8pp.

Schott North America, "Clad Rod/ Image Conduit" Nov. 2004, 1 page.

Selberg, Erik, and Oren Etzioni. "On the Instability of Web Search Engines." In the Proceedings of RIAO, Paris, Apr. 2000, 14pp.

Smithwick, Quinn Y. J., Juris Vagners, Per G. Reinhali, Eric J. Seibel. "54.3: Modeling and Control of the Resonant Fiber Scanner for Laser Scanning Display or Acquisition." *S/D Symposium Digest of Technical Papers*, vol. 34, Issue 1, May 2003:1455-1457.

Sonka, Milan , Vaclav Hlavac, and Roger Boyle, *Image Processing, Analysis, and Machine Vision: (Second Edition)*. International Thomson Publishing, 1998. Contents, Index, Preface, 37pp.

Sony. "Sony Puppy Fingerprint Identity Products." http://bssc.sel.sony.com/Professional/puppy/, 2002, 1 p.

Spitz. A. Lawrence. "Progress in Document Reconstruction." Document Recognition Technologies, Inc. 16th Internaional Conference on Pattern Recognition (ICPR '02), 2002, 4pp.

Spitz, A. Lawrence. "Shape-based Word Recognition." *International Journal on Document Analysis and Recognition*, Oct. 20, 1998, 13 pp.

Srihari. Sargur N., Jonathan J. Hull, and Ramesh Choudhari. "Integrating Diverse Knowledge Sources in Text Recognition." *ACM Transactions in Office Information Systems*. vol. 1, No. 1, Jan. 1983. pp. 68-87.

Stevens, Jacob. Andrew Gee, and Chris Dance. "Automatic Processing of Document Annotations." Xerox Research Centre Europe. http://www.bmva.ac.uk/bmvc/1998/pdf/p062.pdf, 1998, 11 pp.

Su, Guo-Dung J., Shi-Sheng Lee, and Ming C. Wu. "Optical Scanners Realized by Surface—Micromachined Vertical Torsion Mirror" *IEEE Photonics Technology Letters*, vol. 11, No. 5, May 1999, 3pp.

Syscan Imaging. "Travelscan 464." http://www.syscaninc.com/prod_ts_464.html. accessed Oct. 3, 2005, 2pp.

Taghva, Kazem, Julie Borsack, and Allen Condit. "Results of Applying Probabilistic IR to OCR Text." *Proceedings of the 17th Annual International ACM-SIGIR Conference on Research and Development in Information Retrieval*. New York, NY: Springer-Verlag New York, 1994, pp. 202-211.

Tan, Chew Lim, Sam Yuan Sung, Zhauhui Yum and Vi Xu. "Text Retrieval from Document Images Based on N-Gram Algorithm." PRICAI Workshop on Text and Web Mining, 2000. 2 pp.

Trusted Reviews. "Digital Pen Roundup." http://www.trustedreviews.com/article.aspx?art=183, Jan. 24, 2004. 5pp.

TYI Systems Ltd. "Bellus iPen." http://www.bellus.corn.tw/pen_scanner.htm, accessed Oct. 3, 2005, 3pp.

U.S. Precision Lens, Inc. *The Handbook of Plastic Optics a User's Guide with Emphasis on Injection Molded Optics*. Cincinnati, Ohio: U.S. Precision Lens, Inc., 1983, 145pp.

Van Eijkelenborg, Martijn A. "Imaging with Microstructured Polymer Fibre." *Optics Express*, vol. 12, No. 2, Jan. 26, 2004, pp. 342-346.

Vervoort. Marco. "Emile 4.1.6 User Guide" University of Amsterdam, Jun. 12, 2003, 83 pp.

Vocollect. "Vocollect Voice for Handhelds." http://www.vocollect.com/offerings/voice_handhelds.php, accessed Oct. 3, 2005. 2pp.

Vossler, Charles M. and Neil M. Branston. "The Use of Context for Correcting Garbled English Text." Cornell Aeronautical Laboratory, Inc.. *Proceedings of the 1964 19th ACM National Conference.* NY. NY: ACM Press, 13 pp.

Wang, Jin, and Jack Jean. "Segmentation of Merged Characters by Neural Network and Shortest-Path." *Proceedings of the 1993 ACM/SIGAPP Symposium on Applied Computing: States of the Art and Practice.* New York, NY: ACM Press, 1993, pp. 762-769.

Wang, Wei-Chih, Mark Fauver, Jou Nhut Ho, Eric J. Siebel, Per G. Reinhail. "Micrornachined Optical Waveguide Cantilever as a Resonant Optical Scanner." *Sensors and Actuators A (Physical)*, 102(1-2), 2002, pp. 165-175.

Wang, Yalin, Ihsin T. Phillips, and Robert M. Haralick. "A Study on the Document Zone Content Classification Problem." Proceedings of the 5th International Workshop on Document Analysis Systems. London: Springer-Verlag, 2002, 12pp.

WizCom Technologies Ltd. "QuickLink-Pen Elite." http://www.wizcomtech.com/Wizcom/products/product_info.asp?fid=101, Accessed Oct. 3, 2005, 2pp.

WizCorn Technologies. "SuperPen Professional Product Page." http://www.wizcomtech.com/Wizcom/products/product_info.asp?fid=88&cp=1, accessed Oct. 3, 2005, 2pp.

Xerox "Patented Technology Could Turn Camera Phone Into Portable Scanner." Press release Nov. 15, 2004. http://www.xerox.com/go/xrx/template/inv_rel_newsroom.jsp?Xcntry=USA&Xlang=en_US&app=Newsroom&ed_name=NR_2004Nov15_MobileDocument_lmaging_Software&format=article&view=newsrelease&metrics=notrack, 2pp.

Press Release, "Abera Introduces Truly Portable & Wireless Color Scanners: Capture Images Anywhere in the World without Connection to PC," PR Newswire, Oct. 9, 2000, New York, http://proquest.umi.com/pqdweb?did=62278377&sid=5&Fmt=7&clientid=19649&RQT=309&VName=PQD, 3 pages.

"Automatic Computer Translation," www.lingolex.com/translationsoftware.htm, downloaded on Aug. 6, 2000.

Babylon—Online Dictionary and Translation Software, "Text Translations in 75 languages, all in a single click," 1997, 1 page.

Black et at "The Festival Speech Synthesis System," Festival Speech Synthesis System—Table of Contents, http://www.cstr.ed.ac.uk/projects/festival manual/, Jun. 17th, 1999, pp. 1-4 [internet accessed on Jan. 10, 2008].

eBooks, eBooks Quickstart Guide, nI-487, 2001, 2 pages.

Gildea and Miller, "How Children Learn Words," Scientific American, Sep. 1987, vol. 257, No. 3, pp. 94-99.

Globalink, Inc. "Globalink, Inc. announces Talk to Me, an interactive language learning software program," Talk to me Software, Business Wire, Jan. 21, 1997, Fairfax, VA, 4 pages [internet accessed on Jan. 4, 2008].

Henseler, Dr. Hans, "Functional and Document Level Security in ZyIMAGE," Zylab, the Paper Filing Company, ZyIMAGE Security, Whitepaper, Apr. 9, 2004, 27 pgs, ZyLAB Technologies, B.V.

Jacobson et al., "The Last Book", IBM Systems Journal, vol. 36, No. 3, 1997, pp. 457-463.

MacholI, R., "Translation Pen Lacks Practicality," BYTE.com, Jan. 1998, 2 pages.

Nagy et al. "A Prototype Document Image Analysis System for Technical Journals," Computer, vol. 25, issue 7, Jul. 1992, pp. 10-22.

O'Gorman, "Image and Document Processing Techniques for the Right Pages Electronic Library System," 11th International Conference on Pattern Recognition, Aug. 30-Sep. 3, 1992, The Hague, The Netherlands, pp. 260-263, IEEE Computer Society Press, Los Alamitos, CA.

Pellissippi Library, NetLibrary, Skills Guide #4, Sep. 21, 2001, 9 pages.

Schuuring, D., "Best practices in e-discovery and e-disclosure," ZyLAB Information Access Solutions, White Paper, Feb. 17, 2006, 72 pgs, ZyLAB Distributing, B.V.

Sheridon et al., "The Gyricon—A Twisting Ball Display," Proceedings of the Society for Information Display, Third and Fourth Quarter, May 1977, pp. 289-293, Boston, MA.

Stifelman, Lisa J., "Augmenting Real-World Objects: A Paper-Based Audio Notebook," Proceedings of CHI '96, 1996, pp. 199-200.

Story et al. "The Right Pages Image-Based Electronic Library for Alerting and Browsing," Computer, vol. 25, No. 9, Sep. 1992, pp. 17-26.

The Festival Speech Synthesis System, www.cstr.ed.ac.uk/projects/festival downloaded on Jul. 25, 2000, 2 pages [internet accessed Jan. 4, 2008].

Toshifumi et al., "PaperLink: A Technique for Hyperlinking from Real Paper to Electronic Content," Proceedings of CHI 1997, pp. 1-13, CHI 97 Electronic Publications: Papers.

Whittaker et al., "Filochat: Handwritten Notes Provide Access to Recorded Conversations," Human Factors in Computing Systems, CHI '94 Conference Proceedings, Apr. 24-28, 1994, pp. 271-277, Boston Massachusetts.

Whittaker et al., "Using Cognitive Artifacts in the Design of Mulimodal Interfaces," AT&T Labs-Research, May 24, 2004, 63 pages.

Wilcox et al., "Dynomite: A Dynamically Organized Ink and Audio Notebook," Conference on Human Factors in Computing Systems, Jun. 3, 1998, 9 pages.

Hull, Jonathan and Dar-Shyang Lee, Simultaneous Highlighting of Paper and Electronic Documents, © 2000 IEEE, pp. 401-404.

PCT International Search Report for International Application No. PCT/US05/11017, date of mailing Jul. 15, 2008, 2 pages.

PCT International Search Report for International Application No. PCT/US05/11089, date of mailing Jul. 8, 2008, 3 pages.

Non-Final Office Action for U.S. Appl. No. 11/098,038, Mail Date Apr. 3, 2008, 11 pages.

Non-Final Office Action for U.S. Appl. No. 11/097,828, Mail Date May 22, 2008, 38 pages.

Non-Final Office Action for U.S. Appl. No. 11/098,014, Mail Date Jun. 18, 2008, 37 pages.

Non-Final Office Action for U.S. Appl. No. 11/097,833, Mail Date Jun. 25, 2008, 58 pages.

Non-Final Office Action for U.S. Appl. No. 11/097,836, Mail Date May 13, 2008, 56 pages.

Non-Final Office Action for U.S. Appl. No. 11/110,353, Mail Date Jun. 11, 2008, 24 pages.

Final Office Action for U.S. Appl. No. 11/097,835, Mail Date Jun. 23, 2008, 26 pages.

Final Office Action for U.S. Appl. No. 11/098,043, Mail Date Apr. 17, 2008, 45 pages.

* cited by examiner

AUTOMATIC MODIFICATION OF WEB PAGES

CROSS REFERENCE(S) TO RELATED APPLICATIONS

This application claims priority to the following U.S. Provisional Patent Applications: Application No. 60/558,527, filed on Apr. 1, 2004, Application No. 60/558,909, filed on Apr. 2, 2004, Application No. 60/559,766, filed on Apr. 6, 2004, Application No. 60/561,768, filed on Apr. 12, 2004, Application No. 60/564,846, filed on Apr. 23, 2004, Application No. 60/564,688, filed on Apr. 23, 2004, and Application No. 60/602,898, filed on Aug. 18, 2004.

BACKGROUND

The use of printed books and documents (hereafter referred to as simply "documents") has been commonplace for many hundreds of years. Over the centuries, various tools and strategies have evolved to try to make more effective use of printed documents. These range from handwritten (or typed) notes on the contents of documents (either on the document itself or in a separate but related document), to highlighting passages in a document deemed to be of greater significance, to manually copying passages from a document (or using a scanning copier, despite the fact that copyrights are often so infringed), to the simple act of including a printed index at the end of a document to facilitate locating information on a specific topic. Many new tools and strategies are needed now that a document can be accessed in an electronic, searchable format such as a file on a local computer or a web page that can be accessed with a browser.

The relatively recent innovation of providing a searchable electronic copy of a document that can be accessed using a standard personal computer is quite powerful in increasing the ease with which the desired contents can be accessed and utilized. When a traditional index is provided in such a context, once an entry is found, a single click of the mouse can take the user directly to the desired entry in the electronic text. Once a relevant entry has been found, its location can be retained as a "bookmark" and filed according to the user's choice, making future access to the location in the electronic document quick and easy.

It is a problem that these very useful tools for working with electronic documents cannot be used with the vast existing reserve of printed books and documents. Even though there are tremendous advantages that accrue with access to an electronic version of a document, these are obviously only available when such an electronic version is available (and a computer is available to access the electronic document). Even in those instances where such an electronic version is available, this still does nothing to enhance the actual use of the paper document itself. Furthermore, when newer revisions and updated versions of either the paper or the electronic version of a document become available, the owner of a previous version generally has little recourse but to go and purchase a new, updated copy of the material.

As is well known in the art, by using traditional methods for document processing (such as, for example, a flatbed scanner combined with appropriate computer software for optical character recognition), a user can create an electronic version of a paper document. However, in addition to the fact that such a task is laborious, time-consuming, and generally error-prone, it usually involves infringement of the copyright held by the author of the textbook in question. Further, even when an electronic version of a document is thus created, it is still subject to the limitations mentioned above—a computer is required to make any use of the additional features offered, and no additional utility is provided for the paper document itself. Despite the prevalence of computers, and despite the advantages conveyed by searchable electronic versions of documents, the continued widespread preference for creating and using paper documents is a clear indication of how attractive they remain to the average user. The portability, convenience, ease of viewing, and even the "feel" of paper documents clearly retain a powerful appeal to most individuals.

Therefore, there exists a need to allow users to easily navigate between printed and electronic versions of documents. There also exists a need to allow users to easily access electronic document versions or links of a paper document or article.

DETAILED DESCRIPTION

Systems and methods for quickly and easily getting information about, or included in, a paper document into a public or private digital page are described. An example system includes a scanner that generates scan information of at least a portion of a paper document and a processing system in data communication with the scanner over a network. The processing system stores digital content corresponding to a plurality of paper documents into a database, receives the generated scan information from the scanner, searches the database to identify digital content associated with the received scan information, and sends at least one of a portion of the identified digital content or an address associated with the identified digital content to a network-accessible location being associated with the user, if results of that database search are positive. In one embodiment, the network-accessible location is a web log page associated with the user.

In another embodiment of the disclosed innovations, a blogger could scan some text from a paper document with a portable scanning device. The scanning device could either perform optical character recognition (OCR) on the scanned image or transmit either the raw image data or a partially processed version of the image data to a computer for remote OCR processing. The computer would submit at least a portion of the text to a search engine that would locate an electronic version of the paper document and return a hyperlink to the computer. The computer could then modify a predetermined blog page by adding an entry having at least a portion of the scanned text followed by a hyperlink to the electronic document. By optionally including a portion of the scanned text in the blog entry, the hyperlink can be put in context without requiring the blogger to type any explanatory text.

Figure 1:
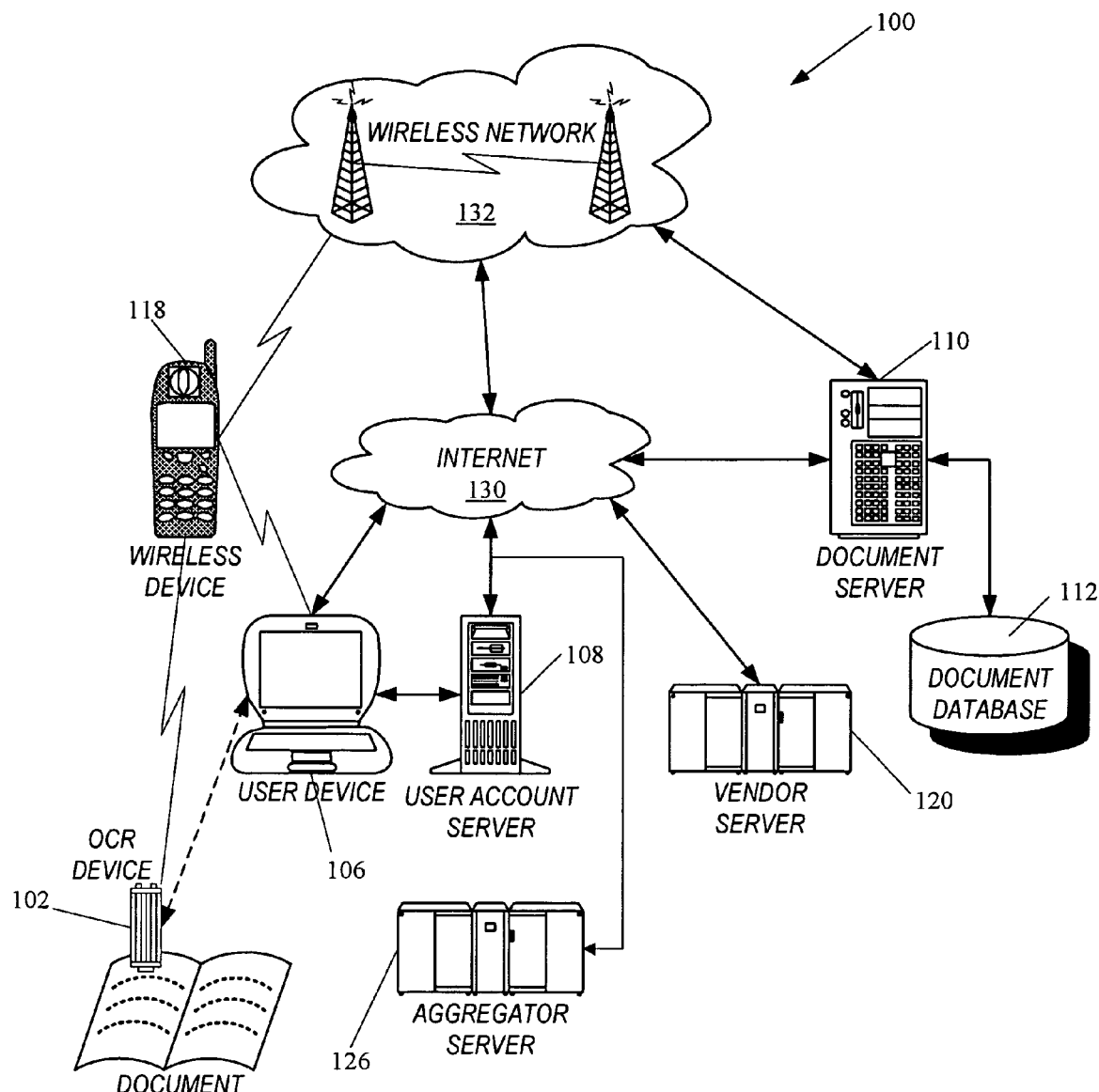
FIG. 1 is a system diagram illustrating a typical environment in which embodiments of the system operate.

FIG. 1 illustrates a typical environment 100 in which some embodiments of the system operate. As illustrated, the example operating environment 100 includes a scanning device 102 (operative to graphically capture a portion of a document 104), a computer 106, wireless device 125, an account server 108 (having an account database), one or more document servers 110 (having document databases 112), vendor server (having an item database), aggregator server 160 (having an aggregator database 165), all interconnected via a network such as the Internet 110.

The computer 106 may include a memory containing computer executable instructions for processing an order request from scanning device 102 by obtaining an order. An example of an order could include an identifier (such as a serial number of the scanning device 102 or an identifier that uniquely identifies the user of the scanner), scanning context information and/or scanned information that serves as the basis for a search of one or more document databases 112 to uniquely identify the digital document corresponding to the document 104 being scanned. The computer 106 also includes a processor and memory. In alternative embodiments, operating environment 100 may include more or less components.

In other embodiments, the system 100 includes a wireless device 118, a vendor server 120 and an aggregator server 126. The servers 120 and 126 are coupled to each other via various sorts of networks (e.g., the Internet 130 or wireless network 132). Regardless of the manner by which the devices are coupled to each other, the scanning device 102, the computer 106, the wireless device 118, the account server 108, the document server 110, the vendor server 120 and the aggregator server 126 may be operable in accordance with well-known commercial transaction and communication protocols. In various embodiments, the functions and capabilities of the scanning device 102, the computer 106, and the wireless device 118 may be wholly or partially integrated into one device. Thus, the terms scanning device, computer and wireless device, could refer to the same device depending upon whether the device incorporates functions or capabilities corresponding to the roles of the scanning device 102, the computer 106 and the wireless device 118.

Additionally, in various embodiments, the computer 106 and the account server 108 may be wholly or partially integrated. Thus, the terms computer and account server, as used herein, for the purpose of this specification, including the claims, shall be interpreted with the meaning of an appropriately equipped device, operating in accordance with either a computer or an account server role.

In accordance with another embodiment, an operating environment 100 includes a document server 110 that has speech recognition capabilities. In this environment, no scanning device 102 is required, and in lieu of scanning a portion of a rendered document, the user reads aloud the portion of the document and the document server 110 performs speech recognition of the spoken text portion to generate the search query to be processed. For example, the user may place a telephone call from wireless device 118 directly to an access number for document server 110, and in response to automated prompts, reads aloud the portion of the rendered document. Because the ultimate task of the server is to identify a document within its database corresponding to the spoken text (that may be assumed to occur within the known corpus of text within the database), the task of correctly recognizing the spoken words is vastly easier than the task of correctly recognizing spoken text when no such information is available to constrain the search domain. This speech-recognition-based approach also has the advantage that it can be implemented using the currently available technology infrastructure, and does not require a user base of individuals who possess a scanning device 102. Thus, in the following disclosure, functions described as being performed by a scanner can alternatively be performed using a speech-recognition-based approach. The unique user identity associated with the scanner may equivalently be associated with, for example, a cellular phone used to call document server 110.

Figure 2:
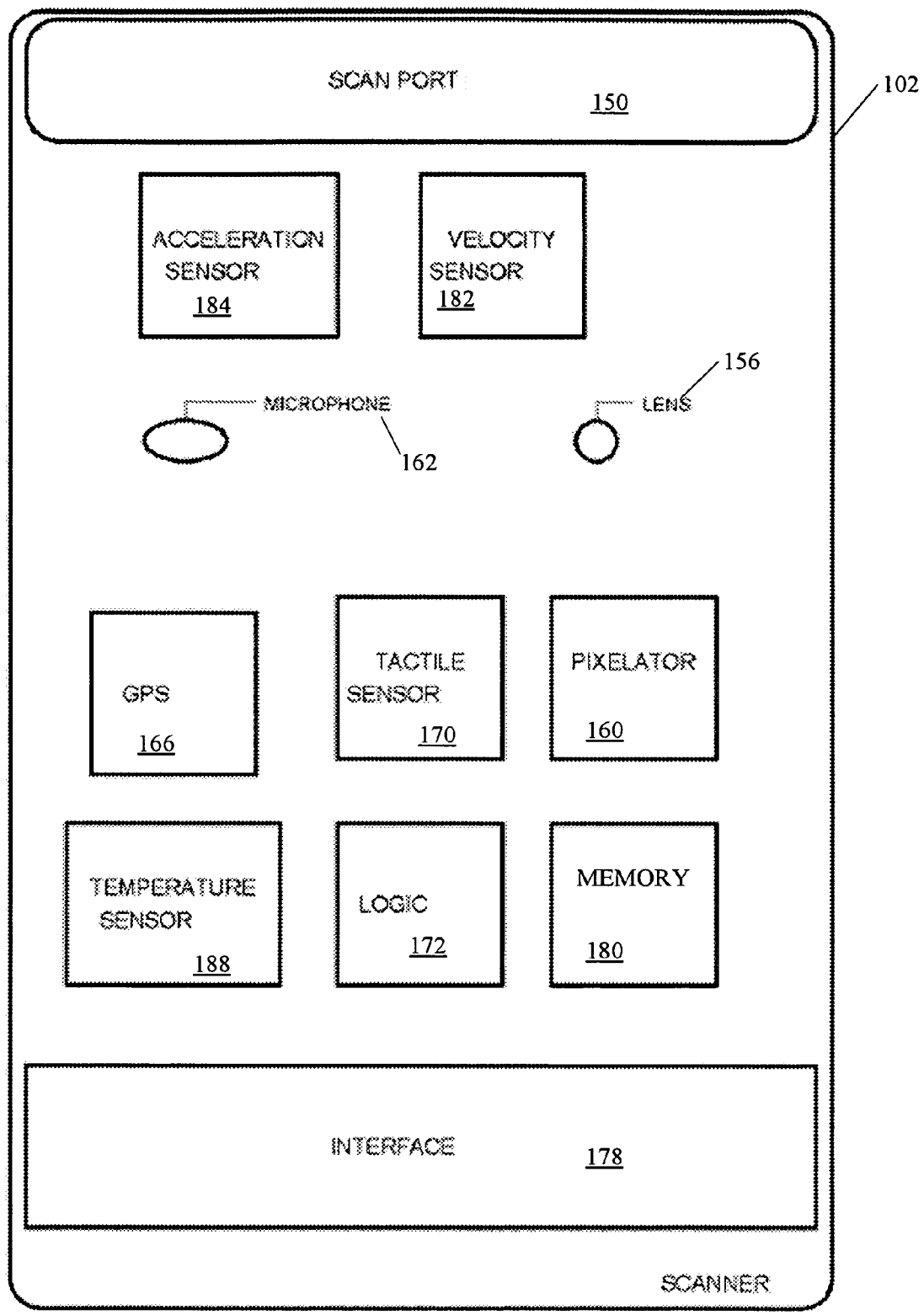
FIG. 2 is a diagram of an example scanner used in the system shown in FIG. 1.

FIG. 2 is a block diagram of an embodiment of a scanner 102. The scanner 102 may include various means for ascertaining a context of a scan. In FIG. 2, the scanner 102 includes a scan port 150 to scan information from rendered documents, and various environmental sensors. The environmental sensors include one or more of a lens 156 (e.g. an aperture to a camera or light-sensitive device), a pixelator 160 to convert visual information of the environment into machine-compatible signals, a microphone 162 to convert sound of the environment (including spoken words) into machine-compatible signals, a Global Positioning System (GPS) 166 to provide a location function, and a tactile sensor 170 to provide sensitivity to contact signals. The scanner 102 also may include logic 172 to interact with the various sensors, possibly processing the received signals into different formats and/or interpretations. The logic 172 may be operable to fetch data and program instructions stored in associated memory such as RAM, ROM, or other suitable memory. The scanner 102 includes an interface 178 to communicate scanned information and environmental signals to a network and/or an associated computing device.

As an example of one use of the scanner 102, a reader may scan some text from a newspaper article with scanner 102. The text is scanned as a bit-mapped image via scan port 150. The logic 172 causes the bit-mapped image to be stored in memory 180. The logic 172 may also perform optical character recognition (OCR) or other post-scan processing on the bit-mapped image to convert it to text or an intermediate form of processed image data. The scanner 102 may then upload the bit-mapped image (or text or processed image data, if post-scan processing has been performed by the logic 172) to the computer 106 via the interface 178.

The scanner 102 further includes a velocity sensor 182 to sense velocity aspects of a scan action (e.g. how fast and in what direction a scan action occurs), an acceleration sensor 184 to detect acceleration aspects of a scan action, and a temperature sensor 188. Of course, not all scanner embodiments may include each of these features, and some embodiments may include additional features not found in the exemplary embodiment.

Figure 3:
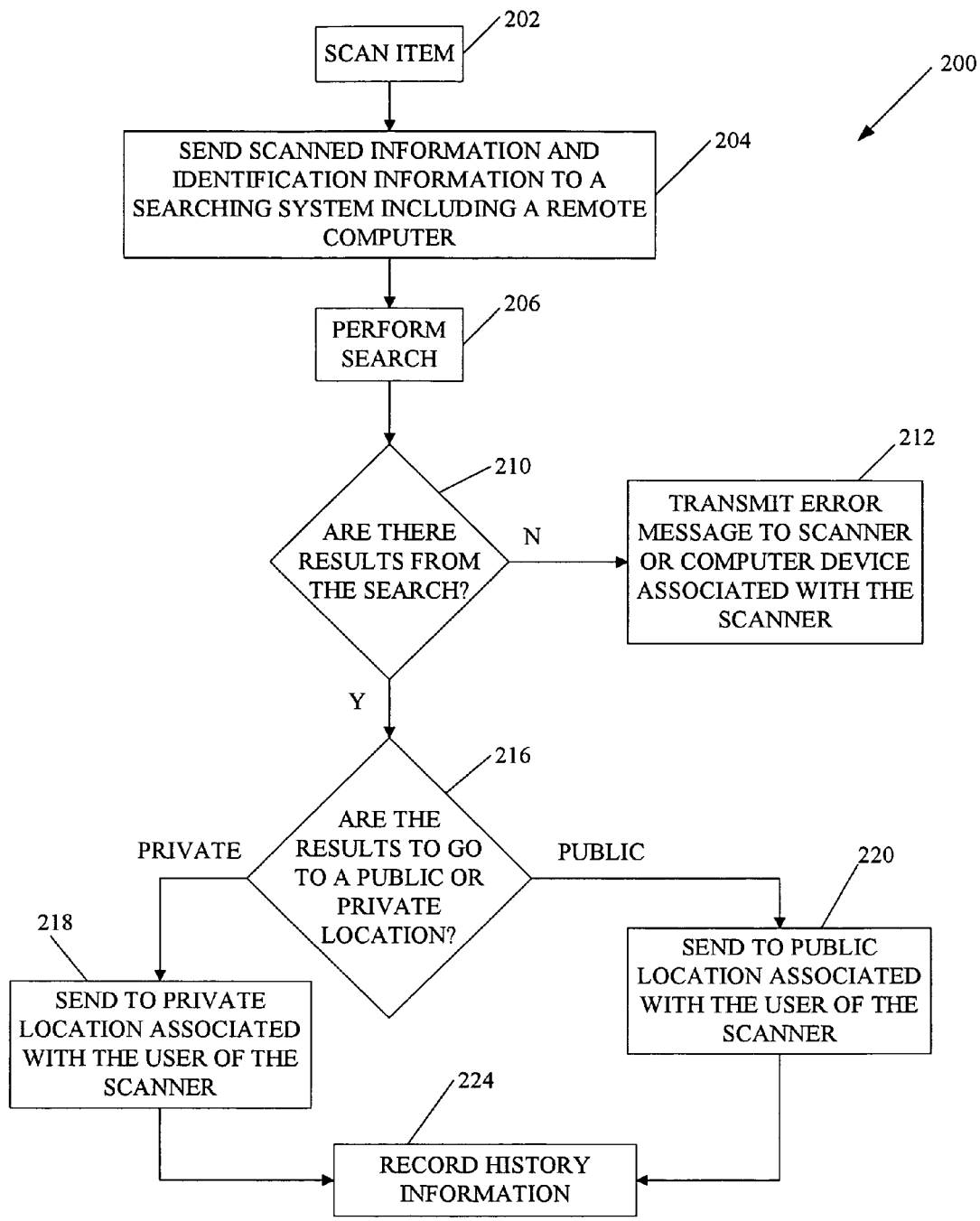
FIG. 3 is a flow diagram of an example process performed by the system of FIG. 1.

FIG. 3 illustrates an example process 200 performed by the system shown in FIG. 1. First, at a block 202, a user scans a document using the scanning device 102. At a block 204, information generated by the scanner 102 from the block 202 is sent to the document server 110 or some other searching system. Information uniquely identifying the scanner and/or the user (e.g., equipment serial numbers, billing information, subscription account number, etc.) is sent with the scanned information. At a block 206, the document server 110 or the searching system performs a search of documents stored in the database 112 or stored in a database distributed across the network 130 at various locations. At a decision block 210, the system 200 determines if there are results of the search. If there are no results of the performed search, then at a block 212, the document server 110 or the searching system sends a message that is presented to a user at the scanning device 102 or at the computer 106 or wireless device 118. The transmitted message is an error message that indicates to the operator of the scanning device 102 that the search based on the scan that they performed failed to identify at least one corresponding document in the database.

If there are results from the search, then the process 200 determines if the results are to go to one or more of a public or private location associated with the operator of the scanning device 102, see decision block 216. The results of the search, whether they be a link to a network-based location of the found results (e.g., a hyperlink) or an actual document (or portion thereof) identified in the search, are sent to a public location, at a block 220. The public location associated with the user can be in a number of different formats. A web log (blog) is one example of a public location that receives the results of the search. In one embodiment, the blog is automated to automatically post the results of the search in various formats. Blogs are described in more detail below. If the results of the search determined at the decision block 216 go to a private location, then a private location associated with the user receives the results of the search, see block 218. Whether the search results go to a public or private location associated with the user, various information of the search and the user may be recorded for later use, see block 224. The information recorded may be used, for example, to establish or modify a ranking within the document database 112 of any of the information or associated documents that were scanned and searched, and also to provide various demographic information with regard to the searcher (e.g., location, age, sex, etc.) and the items scanned by the searcher (which may be used by the document server 110 to create other useful databases).

A blog is an online journal (the contraction of "web log") or a website. A blog usually shows the following primary characteristics:

frequently updated with new content;

content unit is a "post" or an "entry"—it may not necessarily be text but also pictures, sounds, videos, etc.;

posts are dated;

full posts or summaries are displayed on the blog home page with the last or freshest ones on top—that posts are listed in reverse chronologic order makes it very easy to see if a blog has been updated recently, or appears to be stalled, it is therefore an incentive (along with dated posts) for authors to publish frequently in order to keep the content fresh; and posts are accessible through a permanent link and/or chronological archives (daily/weekly/monthly, or a linear previous/next navigation).

A blog may show the following secondary characteristics, which are not necessarily distinctive of blogs but are instrumental in their adoption:

the publication process is supported by a microcontent or personal publishing system—the emergence of those free or cheap systems which help people without knowledge of web technologies to easily publish content on the web has been the key factor in the spread of blogs outside the web-savvy, geek community;

a news feed is available for use with a news aggregator;

visitors may comment on posts, with or without registration, and their comments may appear publicly along with the post. At any time, a blog author may decide on a post-by-post basis if comments are allowed (most blogs allow comments while most web sites do not). Because most blogs allow comments, a blog may provide a newsfeed that includes visitor comments to improve interaction between publishers and their audience;

posts may be classified by categories;

each post may display a list of external links that point to it allowing readers to discover more sources around a particular topic—techniques known as TrackBacks, Pingbacks and Referrer tracking allow for the automatic creation of such back links between two websites;

display a list of other blogs (blogolist) and websites of interest—this is a great way to discover new blogs and also gives a better idea of who are the authors by seeing who they link to; and each time a blog is updated, the blog may "ping" (i.e. signal to) a server that indexes and publishes a list of recently updated blogs (e.g. daypop).

Figure 4:
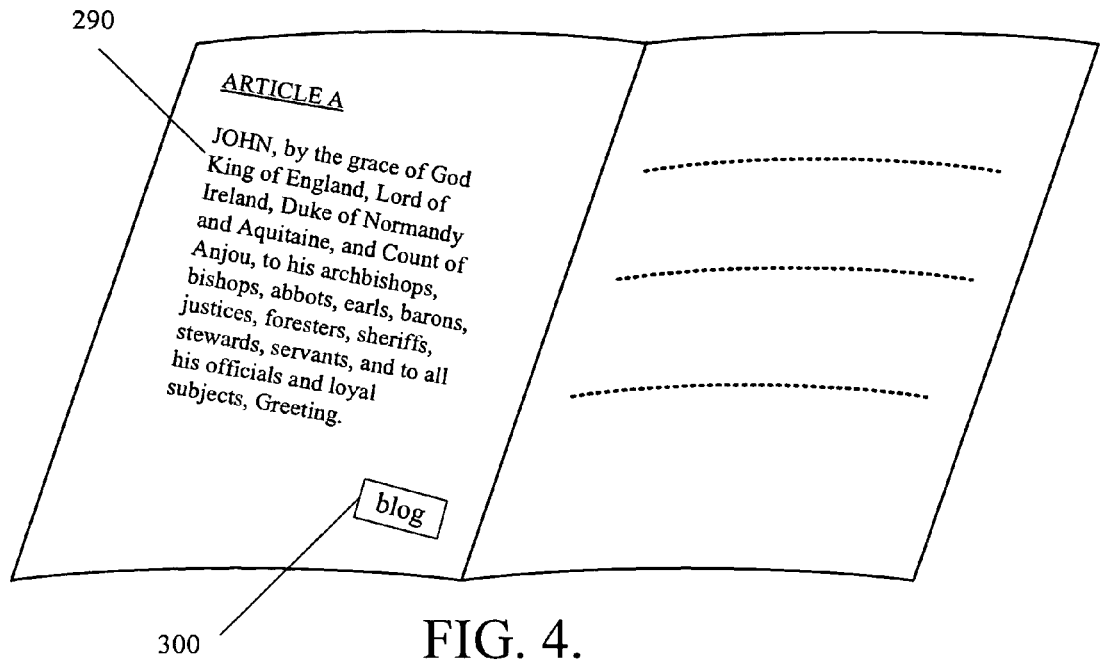
FIG. 4 is a diagram of an example paper document scanned by the scanner of FIG. 2.

FIG. 4 illustrates an article that is presented in a publication that a user may scan. The scan of a portion of the text may record enough information to perform an accurate search for an electronic copy of the associated document that is stored in the document database 112 or at a database associated with a vendor (e.g., publisher). After the user has scanned a portion of the document, the search is performed and the results of the search are sent to either a private or public location associated with the user depending upon some preset criteria.

In another embodiment, the article includes an icon 300 or other type of graphic image or text that when highlighted by the scanner 102 automatically sends any of the results of the search directly to the blog associated with the user. Of course, the control icon 300 does not necessarily have to be on the paper document that includes the article. The control icon 300 may be scanned from any document. For example, the user may carry a wallet-sized card with various control icons that the user may scan to cause the system 100 to perform certain actions. For example, the user may scan a control icon 300 which causes the text from the next scan to be submitted to a search engine and the search results automatically posted to a predetermined blog.

Figure 5:
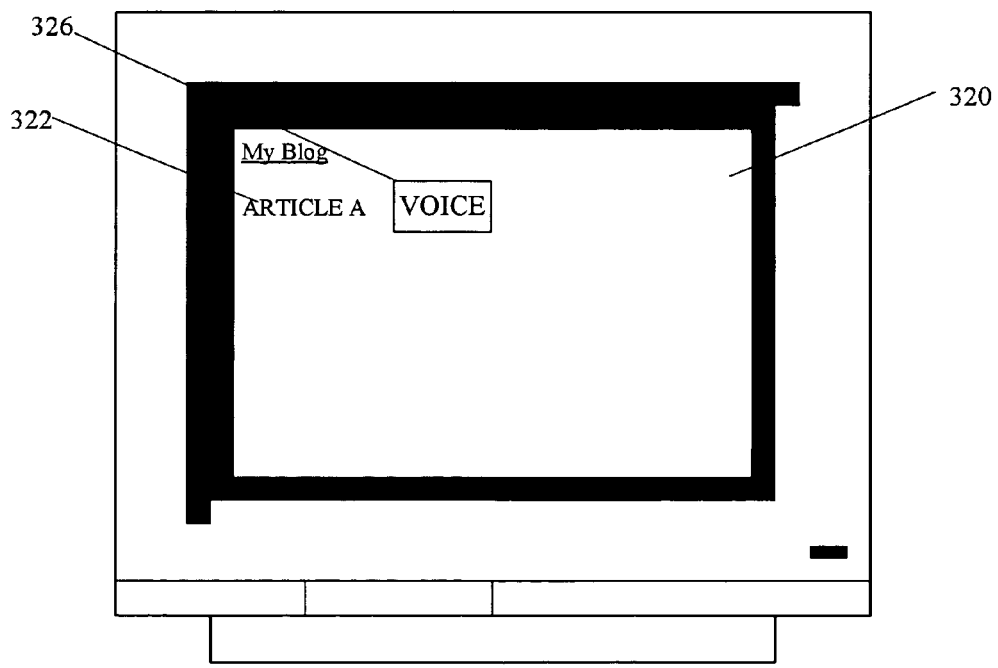
FIG. 5 is a display of an example web log produced by the system of FIG. 1.

FIG. 5 illustrates a blog 320 associated with the user of the scanner. The results of the scanning of the article as shown in FIG. 4 may result in a link to that article being automatically entered and stored into the blog as a hyperlink 322. When a viewer selects the hyperlink 322, the digital article or a web page associated with the article is presented. This may also occur if the user scanned the icon 300 from the publication. Also, if the user has recorded his voice over the microphone 162 of the scanner 102, and desires that this voice recording be accessible through his blog 320, an audio (e.g., voice) icon 326 is presented on his blog 320. When a visitor viewing blog 320 activates the voice icon 326, the user's previously stored voice recording is played back to the visitor who activated the voice icon 326.

While the system has been illustrated and described, as noted above, many changes can be made without departing from its spirit and scope. Accordingly, the scope of the invention is not limited by such illustration and description. Instead, the invention should be determined entirely by reference to the claims that follow.

We claim:

1. A method performed by a portable capture device for updating a web page, the method comprising:

optically or acoustically capturing a portion of a rendered document by the portable capture device, wherein if acoustically captured then the capturing of the portion of the rendered document is performed via a microphone of the portable capture device and includes performing speech recognition on the acoustically captured portion of the rendered document and converting the captured portion to digital content within the portable capture device, and if optically captured then the capturing of the portion of the rendered document includes converting the captured image to digital content within the portable capture device;

generating, at the portable capture device, a textual query string from contents of the captured portion of the rendered document;

submitting, from the portable capture device, the query string to a query engine that indexes full texts of documents;

transmitting, from the portable capture device, an identifier associated with a user of the portable capture device to the query engine;

receiving, at the portable capture device and from the query engine a link to an electronic document that includes the captured portion of the rendered document; and transmitting, from the portable capture device to a web page authoring system, the link to be inserted into a predetermined web page authored by the user of the portable capture device and inserting the link into the predetermined web page.

2. The method of claim 1, further comprising inserting the query string into the predetermined web page.

3. The method of claim 1, further comprising inserting into the predetermined web page a portion of the electronic document proximate to the captured portion.

4. The method of claim 1, wherein the query string includes text that is not within the contents of the captured portion of the rendered document.

5. The method of claim 1, wherein the web page is a weblog.

6. A system in a handheld capture device for updating a web page, comprising:

a capture component, wherein the capture component is configured to optically or acoustically capture a portion of a rendered document using the portable capture device, wherein if acoustically captured then the capture of the portion of the rendered document is performed via a microphone of the portable capture device and includes performinq speech recognition on the acoustically captured portion of the rendered document and converting the captured portion to digital content within the portable capture device, and if optically captured then the capture of the portion of the rendered document includes converting the captured image to the digital content within the portable capture device;

a query generation component, wherein the query generation component is configured to generate at the portable capture device a textual query string from contents of the captured portion of the rendered document;

a query submissiom component, wherein the query submission component is configured to submit, from the portable capture device, the query string to a query engine that indexes full texts of documents;

a user identification component, wherein the user identification component is configured to transmit from the portable capture device an identifier associated with a user of the portable capture device to the query engine;

a link reception component, wherein the link reception component is configured to receive, at the portable capture device and from the query engine, a link to an electronic document that includes the captured portion of the rendered document; and a link transmission component, wherein the link transmission component is configured to transmit, from the portable capture device to a web page authoring system, the link to be inserted into a predetermined web page authored by the user of the portable capture device;

an insertion component that inserts the link into the predetermined web page.

7. A computer-readable medium storing code that when executed causes a handheld capture device to perform a method for updating a web page, comprising:

optically or acoustically capturing a portion of a rendered document, wherein if acoustically captured then the capturing of the portion of the rendered document is performed via a microphone of the portable capture device and includes performing speech recognition on the acoustically captured portion of the rendered document and converting the captured portion to digital content within the portable capture device, and if optically captured then the capturing of the portion of the rendered document includes converting the captured image to digital content within the portable capture device;

generating, at the portable capture device, a textual query string from contents of the captured portion of the rendered document;

submitting, from the portable capture device, the query string to a query engine that indexes full texts of documents;

transmitting, from the portable capture device, an identifier associated with a user of the portable capture device to the query engines;

receiving, at a web page authoring system and from the query engine, a link to an electronic document that includes the captured portion of the rendered document;

transmitting, from the portable capture device to a web page authoring system, the link to be inserted into a predetermined web page authored by the user of the portable capture device; and inserting the link into the predetermined web page.

* * * * *